(12) United States Patent
Kanai et al.

(10) Patent No.: US 7,380,058 B2
(45) Date of Patent: May 27, 2008

(54) STORAGE CONTROL APPARATUS, STORAGE SYSTEM, CONTROL METHOD OF STORAGE CONTROL APPARATUS, CHANNEL CONTROL UNIT AND PROGRAM

(75) Inventors: Hiroki Kanai, Odawara (JP); Seiji Kaneko, Zama (JP)

(73) Assignee: Hitachi, Ltd., Tokyo (JP)

(*) Notice: Subject to any disclaimer, the term of this patent is extended or adjusted under 35 U.S.C. 154(b) by 239 days.

(21) Appl. No.: 10/666,709

(22) Filed: Sep. 19, 2003

(65) Prior Publication Data

US 2004/0123028 A1 Jun. 24, 2004

(30) Foreign Application Priority Data

Sep. 19, 2002 (JP) ............................. 2002-273162

(51) Int. Cl.
*G06F 13/00* (2006.01)
*G06F 13/28* (2006.01)
*G06F 1/26* (2006.01)

(52) U.S. Cl. ..................... 711/113; 711/145; 713/320

(58) Field of Classification Search ...................... None
See application file for complete search history.

(56) References Cited

U.S. PATENT DOCUMENTS

| 4,394,733 | A | | 7/1983 | Swenson | |
|---|---|---|---|---|---|
| 5,155,828 | A | * | 10/1992 | La Fetra et al. | 711/122 |
| 5,396,596 | A | | 3/1995 | Hashemi et al. | |
| 5,568,628 | A | * | 10/1996 | Satoh et al. | 711/113 |
| 5,724,501 | A | | 3/1998 | Dewey et al. | |
| 6,356,978 | B1 | | 3/2002 | Kobayashi et al. | |
| 6,381,674 | B2 | | 4/2002 | DeKoning et al. | |
| 6,477,619 | B1 | | 11/2002 | Fujimoto et al. | |
| 6,513,097 | B1 | * | 1/2003 | Beardsley et al. | 711/113 |
| 2001/0044883 | A1 | | 11/2001 | Abe et al. | |
| 2001/0056527 | A1 | | 12/2001 | Ninomiya et al. | |
| 2002/0107667 | A1 | * | 8/2002 | Mathiske et al. | 702/186 |
| 2004/0172510 | A1 | | 9/2004 | Nagashima et al. | |

FOREIGN PATENT DOCUMENTS

| EP | 1132805 A2 | 9/2001 |
|---|---|---|
| JP | 06-161897 | 6/1994 |
| JP | 11-203201 | 7/1999 |

(Continued)

OTHER PUBLICATIONS

European Patent Office Examination Report dated Oct. 26, 2006 for European patent application EP03021100.7 (Oct. 2006).

*Primary Examiner*—Hyung S. Sough
*Assistant Examiner*—Criag E Walter
(74) *Attorney, Agent, or Firm*—Townsend and Townsend and Crew LLP

(57) ABSTRACT

A storage control apparatus comprising a plurality of channel control units each having an interface with an information processor; a disk control unit having an interface with a storage device for storing data; a cache memory for storing temporarily data to be interchanged between the information processor and the storage device; and an internal connector unit for connecting mutually the plurality of channel control units and the disk control unit, wherein the cache memory is disposed in each of the plurality of channel control units that are connected to one another through a dedicated data transfer path used for storing mutually the data stored in the cache memories.

8 Claims, 22 Drawing Sheets

FOREIGN PATENT DOCUMENTS

| | | |
|---|---|---|
| JP | 11-327811 A | 11/1999 |
| JP | 2000-099281 | 4/2000 |
| JP | 2000-163221 A | 6/2000 |
| JP | 2001-034534 A | 2/2001 |
| JP | 2001-256003 | 9/2001 |
| JP | 2002-123479 | 4/2002 |
| JP | 2002-333956 | 11/2002 |

* cited by examiner

FIG. 9

| (a) | Address of destination | Address of origin | Length to be transferred | Command write | Size to be transferred |

| (b) | Address of destination | Address of origin | Length to be transferred | Data |

| (c) | Address of destination | Address of origin | Length to be transferred | Status information |

| (d) | Address of destination | Address of origin | Length to be transferred | Command Read |

| (e) | Address of destination | Address of origin | Length to be transferred | Data |

| (f) | Address of destination | Address of origin | Length to be transferred | Status information |

STORAGE CONTROL APPARATUS, STORAGE SYSTEM, CONTROL METHOD OF STORAGE CONTROL APPARATUS, CHANNEL CONTROL UNIT AND PROGRAM

CROSS-REFERENCE TO RELATED APPLICATIONS

This application claims priority upon Japanese Patent Application No. 2002-273162 filed on Sep. 19, 2002, which is herein incorporated by reference.

BACKGROUND OF THE INVENTION

1. Field of the Invention

The present invention relates to a storage control apparatus, a storage system, a control method of the storage control apparatus, and a channel control unit.

2. Description of the Related Arts

Various devices have hitherto been used to improve the access speed of large-capacity storage devices employing magnetic disks as their storage media. As one of the devices, disposing a cache memory, which uses a semiconductor device as its storage medium, inside a storage control apparatus for controlling accesses to a storage device has been practiced. Thereby, once data has been read out from a magnetic disk, write/read can be carried out to the cache memory. Therefore, the access speed can be improved.

In a conventional storage control apparatus, configuration is such that a channel control unit for controlling input/output to a host computer and a disk control unit for controlling input/output to a storage device are connected via a network, with a cache memory being deployed on the network. The cache memory is often duplicated providing for loss of data.

However, such a configuration can be a factor preventing the improvement of performance because data accesses are concentrated to the cache memory when the scale of the computer system has been expanded and the numbers of host computers connected and magnetic disks in the storage device have been increased.

In order to avoid the above situation, it is effective that the band of the access path to the cache memory is shifted to a higher region. However, in this case, it is necessary to employ high-performance hardware, resulting in increased costs. Furthermore, as the scale of the system becomes larger, an access path of a higher band is necessary.

As a technique for avoiding such a problem, it was proposed that cache memories were deployed in a distributed manner (Refer to Japanese Patent Application Laid-open Publication No. 11-203201 for example).

However, though in the conventional art described above, the concentration of accesses to a cache memory can be alleviated by the distributed deployment of cache memories, paths on a data-path switch compete and this can be a factor for preventing the improvement of the performance of access when a multiplicity of accesses occur simultaneously since the accesses to the cache memories are made through the data-path switch (the network connecting the channel control unit and the disk control unit).

Furthermore, in a configuration wherein a plurality of cache memories are deployed in a distributed manner on the network connecting the channel control unit and the disk control unit, activity ratio of the network is increased and data competition tends to occur on the network since data transfers between the cache memories carried out for duplication and storage of data are carried out through the network.

SUMMARY OF THE INVENTION

One object of the invention is to provide a storage control apparatus for enabling accesses to data to be made at a higher speed.

One aspect of the invention in order to achieve the above object provides a storage control apparatus including a plurality of channel control units each having an interface with an information processor, the storage control apparatus comprising a disk control unit having an interface with a storage device for storing data; a cache memory for storing temporarily data to be interchanged between the information processor and the storage device; and an internal connector unit connecting the channel control units and the disk control unit to each other. Furthermore, the cache memory is deployed in the channel control units that are connected to one another through a dedicated data transfer path used for storing mutually the data stored in the cache memory.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 9 shows commands for executing the data access process in accordance with the first example;

DETAILED DESCRIPTION OF THE INVENTION

Figure 1:
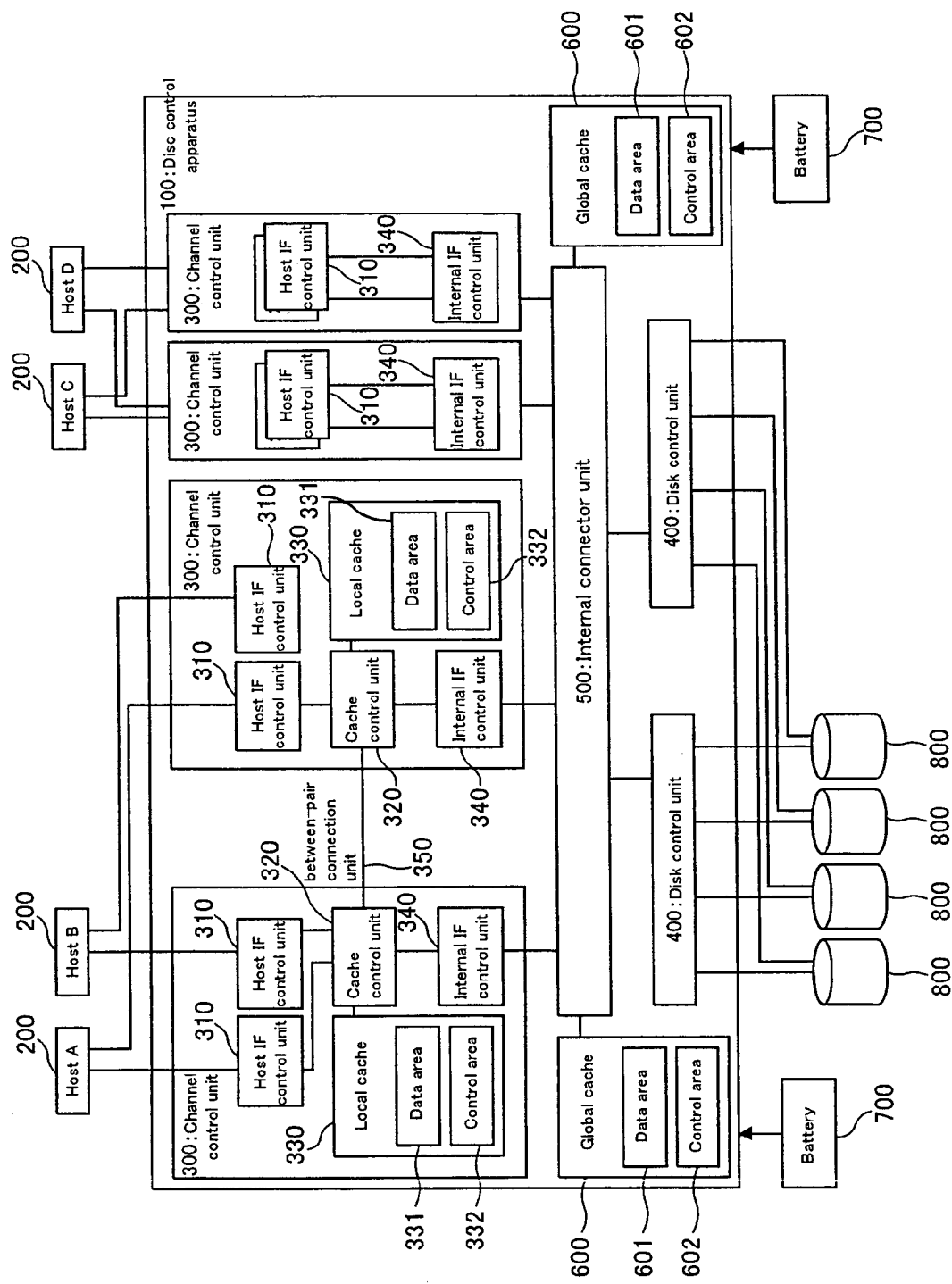
FIG. 1 is a block diagram showing the entire configuration of a computer system in accordance with a first example.

At least the followings will become clear according to the description herein.

An aspect of the present invention provides a storage control apparatus including a plurality of channel control units each having an interface with an information processor; and a disk control unit having an interface with a storage device for storing data; the storage control apparatus comprising cache memories for storing temporarily data to be interchanged between the information processor and the storage device; and an internal connector unit for connecting mutually the plurality of channel control units and the disk control unit, wherein the cache memories are connected to one another through a dedicated data transfer path used for storing mutually the data stored in the cache memories.

According to such an aspect, the activity ratio of the internal connector unit can be suppressed since the data transfer for the data duplication between the cache memories is executed without using the internal connector unit. Therefore, the data competition in the internal connector unit is alleviated and the access speed of the data accesses to the information processors can be made higher. Furthermore, the data duplication process can be executed in a brief period of time since each pair of cache memories paired for duplicating data are connected to each other within the respective pair through a dedicated data transfer path. Therefore, a data access completion acknowledgement can be sent to the information processor in a brief period of time and the access speed can be made higher. Furthermore, maintenance and management of the channel control units can be carried out without influencing the operation of the storage control apparatus by duplicating data stored in a cache memory mutually between the paired channel control units within each pair. For example, since data stored in the cache memory of a channel control unit is also stored in the other channel control unit paired therewith, replacing of the channel control unit can be carried out without saving the data stored in the cache memory onto other storage area than that in the channel control unit. Thus, it is possible to carry out the maintenance and management operation of the storage control apparatus that is required to continuously operate for 24 hours and 365 days without stopping its operation and degrading its functions. Furthermore, when data requested to be accessed by an information processor is present in a cache memory, the information processor can access the data at a high access speed since a cache memory is arranged in the a channel control unit. The data competition in the internal connector unit can be alleviated since these accesses do not pass through the internal connector unit.

Another aspect of the present invention provides a storage control apparatus including a channel control unit having an interface with an information processor; a disk control unit having an interface with a storage device for storing data; a first and a second cache memories for storing temporarily data to be interchanged between the information processor and the storage device; and an internal connector unit for connecting the channel control unit and the disk control unit to each other, wherein the first cache memory is disposed in the channel control unit, and wherein the second cache memory is disposed in the internal connector unit.

According to such an aspect, even when the data to be accessed from the information processor is not stored in a first cache memory, it is not necessary to access the storage device if the data is stored in a second cache memory. Therefore, the access speed from the information processor can be made higher.

Still another aspect of the present invention provides a storage control apparatus including a plurality of channel control units each having an interface with an information processor; a disk control unit having an interface with a storage device for storing data; and a first and a second cache memories for storing temporarily data to be interchanged between the information processor and the storage device; and an internal connector unit for connecting mutually the plurality of channel control units and the disk control unit, wherein the first cache memory is disposed in each of the plurality of channel control units that are connected to one another through a dedicated data transfer path used for storing mutually the data stored in the first cache memories, and wherein a couple of the second cache memories for storing mutually the same data are connected to the internal connector unit.

According to such an aspect, the activity ratio of the internal connector unit can be suppressed since data transfer between the first cache memories for duplication of data is executed without using the internal connector unit. Therefore, the data competition in the internal connector unit can be alleviated and the speed of accesses to the data in the information processor can be made higher. Furthermore, the data duplication process can be executed in a brief period of time since each pair of the first cache memories paired for duplicating of data are connected to each other within the respective pair through a dedicated data transfer path.

Therefore, a data access completion acknowledgement can be sent to the information processor in a brief period of time and the access speed can be made higher. Furthermore, maintenance and management of the channel control units can be carried out without influencing the operation of the storage control apparatus by duplicating the data stored in a cache memory mutually between the paired channel control units within each pair.

For example, since data stored in the cache memory of a channel control unit is also stored in the other channel control unit paired therewith, replacing of the channel control unit can be carried out without saving the data stored in the cache memory onto other storage area than that in the channel control unit. Thus, it is possible to carry out the maintenance and management operation of the storage control apparatus that is required to continuously operate for 24 hours and 365 days without stopping its operation and degrading its functions.

When data requested to be accessed by an information processor is present in the first cache memory, the information processor can access the data at a high access speed since the first cache memory is arranged in the channel control unit. The data competition in the internal connector unit can be alleviated since these accesses do not pass through the internal connector unit. Furthermore, even when the data to be accessed by the information processor is not stored in the first cache memory, it is not necessary to access a storage device if the data is stored in the second cache memory. Therefore, access speed from an information processor to data can be made higher.

Yet another aspect of the present invention is provided with the storage control apparatus and the storage device.

Still yet another aspect of the present invention provides a method for writing data to a cache memory by a channel control unit for the case where a data write-in request is issued from an information processor to a storage control apparatus, the storage control apparatus including a plurality of the channel control units each having an interface with the information processor; a disk control unit having an interface with a storage device for storing data; the cache memory for storing temporarily data to be interchanged between the information processor and the storage device, the cache memory being disposed in each of the plurality of channel control units that are connected to one another through a dedicated data transfer path used for storing mutually the data temporarily stored; and an internal connector unit for connecting mutually the plurality of channel control units and the disk control unit, the method for writing comprising the steps of receiving data to be written from the information processor; writing the data to be written to the cache memory; transmitting the data to be written through the dedicated data transfer path to the other channel control unit connected to each other through the dedicated data transfer path; receiving through the dedicated data transfer path an acknowledgement notifying that writing of the transmitted data to the cache memory disposed in the other channel control unit has been completed, from the other channel control unit; and transmitting the acknowledgement notifying that writing to the cache memory of the data to be written has been completed, to the information processor.

According to such an aspect, the activity ratio of the internal connector unit can be suppressed since the data transfer for the data duplication between the cache memories is executed without using the internal connector unit. Therefore, the data competition in the internal connector unit can be alleviated and the access speed of the data accesses to the information processors can be made higher. Furthermore, the data duplication process can be executed in a brief period of time since each pair of cache memories paired for duplicating of data are connected to each other within the respective pair through a dedicated data transfer path. Therefore, a data access completion acknowledgement can be sent to the information processor in a brief period of time and the access speed can be made higher.

Furthermore, maintenance and management of the channel control units can be carried out without influencing the operation of the storage control apparatus by duplicating data stored in a cache memory mutually between the paired channel control units within each pair. For example, since data stored in the cache memory of a channel control unit is also stored in the other channel control unit paired therewith, replacing of the channel control unit can be carried out without saving the data stored in the cache memory onto other storage area than that in the channel control unit. Thus, it is possible to carry out the maintenance and management operation of the storage control apparatus that is required to continuously operate for 24 hours and 365 days without stopping its operation and degrading its functions.

Yet still another aspect of the present invention provides a method for reading in data stored in a second cache memory to a first cache memory by a channel control unit in a storage control apparatus, the storage control apparatus including a plurality of the channel control units each having an interface with an information processor; a disk control unit having an interface with a storage device for storing data; the first cache memory for storing temporarily data to be interchanged between the information processor and the storage device, the first cache memory being disposed in each of the plurality of channel control units that are connected to one another through a dedicated data transfer path used for storing mutually the data temporarily stored; a couple of the second cache memories for storing the same data mutually; and an internal connector unit for connecting mutually the plurality of channel control units, the disk control unit and the couple of second cache memories, the method for reading in comprising the steps of transmitting a read-in command of the data to the second cache memory; acquiring the data from the second cache memory; writing the acquired data to the first cache memory; transmitting the acquired data through the dedicated data transfer path to the other channel control unit connected to each other through the dedicated data transfer path; and receiving an acknowledgement notifying that the writing of the transmitted data to the cache memory disposed in the other channel control unit has been completed, from the other channel control unit.

According to such an aspect, the activity ratio of the internal connector unit can be suppressed since data transfer between the first cache memories for duplicating of data is executed without using the internal connector unit. Therefore, the data competition in the internal connector unit can be alleviated and the speed of accesses to the data in the information processor can be made higher. Furthermore, the reliability of data can be improved since the data read out from a second cache memory is written in two (2) first cache memories in a duplicated manner. Furthermore, maintenance and management of the channel control units can be carried out without influencing the operation of the storage control apparatus by duplicating data stored in a cache memory mutually between the paired channel control units within each pair.

For example, since data stored in the cache memory of a channel control unit is also stored in the other channel control unit paired therewith, replacing of the channel control unit can be carried out without saving the data stored in the cache memory onto other storage area than that in the channel control unit. Thus, it is possible to carry out the maintenance and management operation of the storage control apparatus that is required to continuously operate for 24 hours and 365 days without stopping its operation and degrading its functions.

A further aspect of the present invention provides a method for reading out data by a channel control unit for the case where a data read-out request is issued from an information processor to a storage control apparatus, the storage control apparatus including a plurality of the channel control units each having an interface with the information processor; a disk control unit having an interface with a storage device for storing data; a first cache memory for storing temporarily data to be interchanged between the information processor and the storage device, the first cache memory being disposed in each of the plurality of channel control units connected to one another through a dedicated data transfer path used for storing mutually the data temporarily stored; a couple of second cache memories for storing the same data mutually; and an internal connector unit for connecting mutually the plurality of channel control units, the disk control unit and the couple of second cache memories, the method for reading out comprising the steps of receiving from the information processor a read-out command for data for which the address is specified; determining whether the data at the specified address is stored in the first cache memory; transmitting a read-in command of the data to the second cache memory if the data at the specified address is not stored in the first cache memory; acquiring the data from the second cache memory; writing the acquired data to the first cache memory; transmitting the acquired data through the dedicated data transfer path to the other channel control unit connected to each other through the dedicated data transfer path; receiving from the other channel control unit an acknowledgement notifying that writing of the transmitted data to the cache memory disposed in the other channel control unit has been completed; and transmitting the data to the information processor.

According to such an aspect, when data is requested to be read out from an information processor, in a case where the data is not stored in a first cache memory, the data can be sent to the information processor without accessing to the storage device if the data is stored in a second cache memory. Furthermore, the data having been read out from the second memory is written in two (2) first cache memories in a duplicated manner. Therefore, the next or later accesses can be responded with the data on the first cache memory.

Furthermore, the activity ratio of the internal connector unit can be suppressed since the duplication of data between first cache memories is executed through dedicated data transfer paths and the internal connector unit is not used. Therefore, the data competition in the internal connector unit is alleviated and the speed of accesses to data in the information processors can be made higher. Furthermore, since the data on the first cache memories is stored in a duplicated manner, the reliability of the data can be improved.

Furthermore, maintenance and management of the channel control units can be carried out without influencing the operation of the storage control apparatus since this duplication is effected between the paired channel control units. For example, since data stored in the cache memory of a certain channel control unit is also stored in the other channel control unit to be paired therewith, replacing of the channel control unit can be carried out without saving the data stored in the cache memory onto other storage area than that in the channel control unit. Thus, it is possible to carry out the maintenance and management operation of the storage control apparatus that is required to continuously operate for 24 hours and 365 days without stopping its operation and degrading its functions.

A still further aspect of the present invention provides a method for writing out data stored in a first cache memory to a second cache memory by a channel control unit in a storage control apparatus, the storage control apparatus including a plurality of the channel control units each having an interface with an information processor; a disk control unit having an interface with a storage device for storing data; the first cache memory for storing temporarily data to be interchanged between the information processor and the storage device, the first cache memory being disposed in each of the plurality of channel control units connected to one another through a dedicated data transfer path used for storing mutually the data temporarily stored; a couple of the second cache memories for storing the same data mutually; and an internal connector unit for connecting mutually the plurality of channel control units, the disk control unit and the couple of second cache memories, the method for writing out comprising the steps of selecting the data to be written out to the second cache memory among the data stored in the first cache memory; securing a storage area to write in the selected data to the second cache memory; and transmitting the selected data to the second cache memory.

According to such an aspect, in a case where a storage area on a first cache memory is required to be made open, when a write-in process to a second cache memory of the data to be replaced from the first cache memory is completed, the storage area on the first cache memory where the data is stored can be made open. Since there are no second memories conventionally, any storage area on the first cache memories can not be made open until the data to be replaced is written in a storage device. According to this aspect of implementation, it is possible to execute a replacing process of a cache memory in a brief period of time.

In such a case, the selection is preferably carried out by selecting data that has not been accessed for the longest period of time.

According to such an aspect, it is possible to replace data assumed to be least necessary to be stored in a first cache memory to a second cache memory.

A yet further aspect of the present invention provides a method for storing by a storage control apparatus into a storage device data stored in a first cache memory and in a second cache memory for the case where power supply to the storage control apparatus is interrupted, the storage control apparatus including a plurality of channel control units each having an interface with an information processor; a disk control unit having an interface with the storage device for storing data; the first cache memory for storing temporarily data to be interchanged between the information processor and the storage device, the first cache memory being disposed in each of the plurality of channel control units connected to one another through a dedicated data transfer path used for storing mutually the data temporarily stored; a couple of the second cache memories for storing the same data mutually; and an internal connector unit for connecting mutually the plurality of channel control units, the disk control unit and the couple of second cache memories, the method for storing comprising the steps of switching the power source to a battery provided in advance in the storage control apparatus; writing to the second cache memory data stored in the first cache memory that has been updated by the information processor and that has not yet been written into the second cache memory; reducing the amount of power supplied from the battery to the channel control unit after completion of the writing to the second cache memory; writing to the storage device data stored in the second cache memory that has been updated by the information processor and that has not yet been written in to the storage device; and cutting off the supply of power from the battery to the storage control apparatus after completion of the writing to the storage device.

It is thus possible to improve the reliability of the system since data on cache memories is not lost even when a sudden power failure etc. occurs.

A still yet further aspect of the present invention provides a channel control unit in a storage control apparatus including a plurality of the channel control units each having an interface with an information processor; a disk control unit having an interface with a storage device for storing data; and a cache memory for storing temporarily data to be interchanged between the information processor and the storage device, the channel control unit comprising an internal connector unit for connecting mutually the cache memory, the plurality of channel control units and the disk control unit, the cache memory being disposed in each of the plurality of channel control units connected to one another through a dedicated data transfer path used for storing mutually the stored data; means for receiving data to be written from the information processor; means for writing the data to be written to the cache memory; means for transmitting the data to be written through the dedicated data transfer path to the other channel control unit connected to each other through the dedicated data transfer path; means for receiving from the other channel control unit through the dedicated data transfer path an acknowledgement notifying that the writing of the transmitted data to the cache memory disposed in the other channel control unit has been completed; and means for transmitting to the information processor the acknowledgement notifying that the writing to the cache memory of the data to be written has been completed.

A yet still further aspect of the present invention provides a channel control unit in a storage control apparatus including a plurality of the channel control units each having an interface with the information processor; a disk control unit having an interface with a storage device for storing data; a first cache memory for storing temporarily data to be interchanged between the information processor and the storage device, the first cache memory being disposed in each of the plurality of channel control unit connected to one another by a dedicated data transfer path used for storing mutually the data temporarily stored; a couple of second cache memories for storing the same data mutually; and an internal connector unit for connecting mutually the plurality of channel control units, the disk control unit and the couple of second cache memories, the channel control unit comprising means for transmitting to the second cache memory a read-in command for data stored in the second cache memory; means for acquiring the data from the second cache memory; means for writing the acquired data to the first cache memory; means for transmitting the acquired data through the dedicated data transfer path to the other channel control unit connected to each other through the dedicated data transfer path; and means for receiving from the other channel control unit an acknowledgement notifying that the writing of the transmitted data to the cache memory disposed in the other channel control unit has been completed.

A further aspect of the present invention provides a channel control unit in a storage control apparatus including a plurality of the channel control units each having an interface with an information processor; a disk control unit having an interface with a storage device for storing data; a first cache memory for storing temporarily data to be inter-changed between the information processor and the storage device, the first cache memory being disposed in each of the plurality of channel control units connected to one another through a dedicated data transfer path used for storing mutually the data temporarily stored; a couple of second cache memories for storing the same data mutually; and an internal connector unit for connecting mutually the plurality of channel control units, the disk control unit and the couple of second cache memories, the channel control unit comprising means for receiving from the information processor a read-out command for data for which the address is specified; means for determining whether the data at the specified address is stored in the first cache memory; means for transmitting the read-in command for the data to the second cache memory if the data at the specified address is not stored in the first cache memory; means for acquiring the data from the second cache memory; means for writing the acquired data to the first cache memory; means for transmitting the acquired data through the dedicated data transfer path to the other channel control unit connected to each other through the dedicated data transfer path; means for receiving from the other channel control unit an acknowledgement notifying that the writing of the transmitted data to the cache memory disposed in the other channel control unit has been completed; and means for transmitting the data to the information processor.

A further aspect of the present invention provides a channel control unit in a storage control apparatus including a plurality of the channel control units each having an interface with an information processor; a disk control unit having an interface with a storage device for storing data; a first cache memory for storing temporarily data to be interchanged between the information processor and the storage device, the first cache memory being disposed in each of the plurality of channel control units connected to one another through a dedicated data transfer path used for storing mutually the data temporarily stored; a couple of second cache memories for storing the same data mutually; and an internal connector unit for connecting mutually the plurality of channel control units, the disk control unit and the couple of second cache memories, the channel control unit comprising means for selecting the data to be written out to the second cache memory among data stored in the first cache memory; means for securing a storage area to write in the selected data to the second cache memory; and means for transmitting the selected data to the second cache memory.

In such a case, the selection is preferably carried out by selecting the data that has not been accessed for the longest period of time.

A further aspect of the present invention provides a storage control apparatus including a plurality of channel control units each having an interface with an information processor; a disk control unit having an interface with a storage device for storing data; a first cache memory for storing temporarily data to be interchanged between the information processor and the storage device, the first cache memory being disposed in each of the plurality of channel control units connected to one another through a dedicated data transfer path used for storing mutually the data temporarily stored; a couple of second cache memories for storing the same data mutually; and an internal connector unit for connecting mutually the plurality of channel control units, the disk control unit and the second cache memories, the storage control apparatus comprising a battery for continuously supplying power when supply of power to the storage control apparatus is interrupted; means for switching the power source to the battery when supply of power to the storage control apparatus is interrupted; means for writing to the second cache memory data stored in the first cache memory that has been updated by the information processor and that has not yet been written in to the second cache memory; means for reducing the supply of power from the battery to the channel control unit after completion of writing to the second cache memory; means for writing to the storage device data stored in the second cache memory that has been updated by the information processor and that has not yet been written in to the storage device; and means for cutting off the supply of power from the battery to the storage control apparatus after completion of the writing to the storage device.

A further aspect of the present invention relates to a program for causing a channel control unit in a storage control apparatus including a plurality of the channel control units each having an interface with the information processor; a disk control unit having an interface with a storage device for storing data; a cache memory for storing temporarily data to be interchanged between the information processor and the storage device, the cache memory being disposed in each of the plurality of channel control units connected to one another through a dedicated data transfer path used for storing mutually the data temporarily stored; and an internal connector unit for connecting mutually the plurality of channel control units and the disk control unit to execute the steps of receiving data to be written from the information processor; writing the data to be written to the cache memory; transmitting the data to be written through the dedicated data transfer path to the other channel control unit connected to each other through the dedicated data transfer path; receiving from the other channel control unit through the dedicated data transfer path an acknowledgement notifying that the writing of the transmitted data to the cache memory disposed in the other channel control unit has been completed; and transmitting to the information processor an acknowledgement notifying that the writing to the cache memory of the data to be written has been completed.

A further aspect of the present invention relates to a program for causing a channel control unit in a storage control apparatus including a plurality of the channel control units each having an interface with an information processor; a disk control unit having an interface with a storage device for storing data; a first cache memory for storing temporarily data to be interchanged between the information processor and the storage device, the first cache memory being disposed in each of the plurality of channel control units connected to one another through a dedicated data transfer path used for storing mutually the data temporarily stored; a couple of second cache memories for storing the same data mutually; and an internal connector unit for connecting mutually the plurality of channel control units, the disk control unit and the couple of second cache memories to execute the steps of transmitting to the second cache memory a read-in command for data stored in the second cache memory; acquiring the data from the second cache memory; writing the acquired data to the first cache memory; transmitting the acquired data through the dedicated data transfer path to the other channel control unit connected to each other through the dedicated data transfer path; and receiving from the other channel control unit an acknowledgement notifying that the writing of the transmitted data to the cache memory disposed in the other channel control unit has been completed.

A further aspect of the present invention relates to a program for causing a channel control unit in a storage control apparatus including a plurality of channel control units each having an interface with an information processor; a disk control unit having an interface with a storage device for storing data; a first cache memory for storing temporarily data to be interchanged between the information processor and the storage device, the first cache memory being disposed in each of the plurality of channel control units connected to one another through a dedicated data transfer path used for storing mutually the data temporarily stored; a couple of second cache memories for storing the same data mutually; and an internal connector unit for connecting mutually the plurality of channel control units, the disk control unit and the couple of second cache memories to execute the steps of receiving from the information processor a read-out command for data for which the address is specified; determining whether the data at the specified address is stored in the first cache memory; transmitting a read-in command for the data at the specified address to the first cache memory if the data is not stored in the first cache memory; acquiring the data from the second cache memory; writing the acquired data to the first cache memory; transmitting the acquired data through the dedicated data transfer path to the other channel control unit connected to each other through the dedicated data transfer path; receiving from the other channel control unit an acknowledgement notifying that the writing of the transmitted data to the cache memory disposed in the other channel control unit has been completed; and transmitting the data to the information processor.

A further aspect of the present invention relates to a program for causing a channel control unit in a storage control apparatus including a plurality of channel control units each having an interface with an information processor; a disk control unit having an interface with a storage device for storing data; a first cache memory for storing temporarily data to be interchanged between the information processor and the storage device, the first cache memory being disposed in each of the plurality of channel control units connected to one another through a dedicated data transfer path used for storing mutually the data temporarily stored; a couple of second cache memories for storing the same data mutually; and an internal connector unit for connecting mutually the plurality of channel control units, the disk control unit and the couple of second cache memories to execute the steps of selecting data to be written out to the second cache memory among data stored in the first cache memory; securing a storage area to write the selected data to the second cache memory; and transmitting the selected data to the second cache memory.

In such a case, the selection is preferably carried out by selecting the data that has not been accessed for the longest period of time.

A further aspect of the present invention relates to a program for causing a storage control apparatus including a plurality of channel control units each having an interface with an information processor; a disk control unit having an interface with a storage device for storing data; a first cache memory for storing temporarily data to be interchanged between the information processor and the storage device, the first cache memory being disposed in each of the plurality of channel control units connected to one another through a dedicated data transfer path used for storing mutually the data temporarily stored; a couple of second cache memories for storing the same data mutually; and an internal connector unit for connecting mutually the plurality of channel control units, the disk control unit and the couple of second cache memories to execute the steps of switching the power source to a battery for continuously supplying power to the storage control apparatus when the supply of power to the storage control apparatus is interrupted; writing to the second cache memory data stored in the first cache memory that has been updated by the information processor and that has not yet been written into the second cache memory; reducing the amount of power supplied from the battery to the channel control unit after completion of the writing to the second cache memory; writing to the storage device data stored in the second cache memory that has been updated by the information processor and that has not yet been written into the storage device; and cutting off the supply of power from the battery to the storage control apparatus after completion of the writing to the storage device.

EXAMPLES

First Example

FIG. 1 is a block diagram showing the entire configuration of a computer system according to a first example.

A disk control apparatus (storage control apparatus) 100 is connected to four host computers (information processors) 200 and receives requests for reading/writing of data. Access routes between each host computer 200 and the disk control apparatus 100 are duplexed and adapted such that one same host computer 200 is connected to different channel control units 300. By adapting in this manner, when a fault occurs on one access route, a disk access process can be continued on the other access route.

A channel control unit 300 comprises host interface control units 310 and has an interface function with the host computers 200. The channel control unit 300 also comprises a cache control unit 320 and a local cache (a first cache memory) 330, and strives for realizing disk accesses at a higher speed by storing temporarily the data read out from a storage device 800. The cache control unit 320 is mutually connected with a cache control unit 320 of another channel control unit 300 paired with the channel control unit 300 through a between-pair connection unit 350, and executes duplication of data by mutually storing data in each other's local cache 330.

The channel control unit 300 comprises an internal interface control unit 340 and is connected with global caches (second cache memories) 600 and disk control units 400 through an internal connector unit 500.

A disk control unit 400 has an interface function for connecting with storage devices 800. Data read out from a storage device 800 by a disk control unit is stored in a data area in a global cache 600 through the internal connector unit 500 and, then, stored in a data area 331 in a local cache 330 through an internal interface control unit 340 and a cache control unit 320 in a channel control unit 300.

Two global caches 600 are provided and strive for duplicating of data by storing mutually the data stored by each other.

The disk control apparatus 100 secures a power source for emergency using a battery 700. Therefore, even when the supply of power to the disk control apparatus 100 is terminated due to a power-down, the disk control apparatus 100 can write the data stored in the local cache 330 and the global cache 600, into a storage device 800 while it is powered by the battery 700. Therefore, the data stored in the local cache 330 and the global cache 600 is prevented from being lost.

Figure 2:
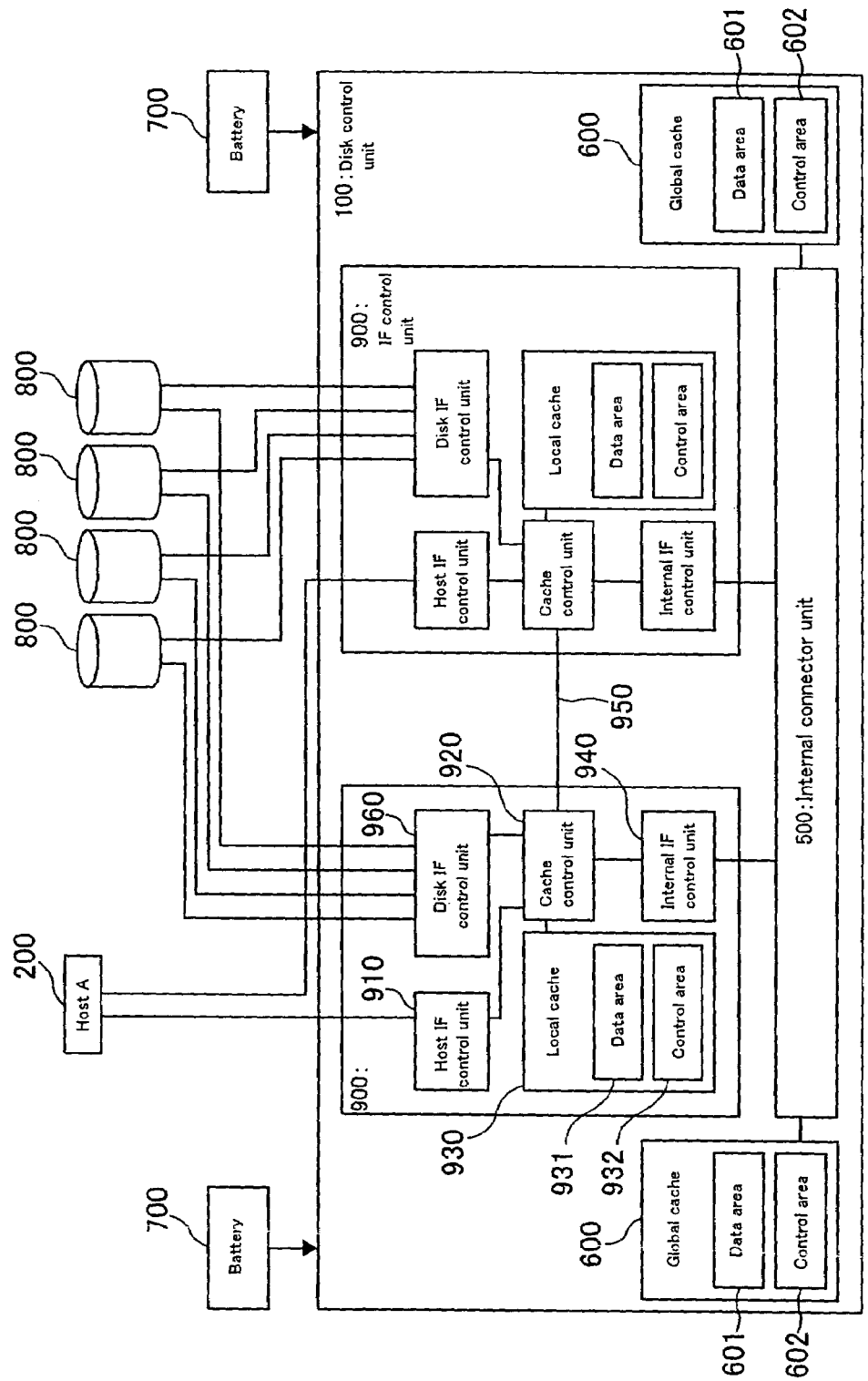
FIG. 2 is a block diagram showing the entire configuration of a computer system in accordance with another aspect of the first example.

FIG. 2 is a block diagram showing the entire configuration of a computer system according to another embodiment of the computer system shown in FIG. 1.

This embodiment is formed by integrating channel control units 300 and a disk control unit 400 shown in FIG. 1. A control unit 900 comprises a host interface control unit 910 working as an interface with a host computer 200 and a disk interface control unit 960 working as an interface with storage devices 800.

According to this embodiment, it is possible to expand a system easily by adding packages since channel control units, disk control units and caches are constituted on a same package. A package is constituted as one part by forming a plurality of functions in modules. Maintenance and management such as replacing of parts are carried out module by module. The configuration shown in FIG. 1 is adapted such that the cost reduction effect is maximal in the largest-scaled system assuming that the scale of the system is largest, and is suitable for large-scale configurations. Therefore, this configuration is effective for a case where a customer whose business has been already stable realizes a relatively large configuration. In contrast, the configuration shown in FIG. 2 is adapted such that the cost effect is maximal at the time of initial introduction and, since it still maintains its expansiveness, it is suitable for medium-scale and large-scale configurations. Therefore, it is effective for a case where a customer who is going to start a business or a customer whose business circumstances varies drastically realizes a system that is flexible enough for changing the system scale according to the customer's situation.

Furthermore, data read out from a storage device 800 by a disk control unit 960 is stored in a data area 931 of a local cache through a cache control unit 920. Therefore, read-out at a high speed is enabled since the data do not pass through internal connector units 500 or global caches 600.

Since other portion of the configuration is same as the configuration of the computer system shown in FIG. 1, the detailed description will be given based on the example shown in FIG. 1.

Figure 3:
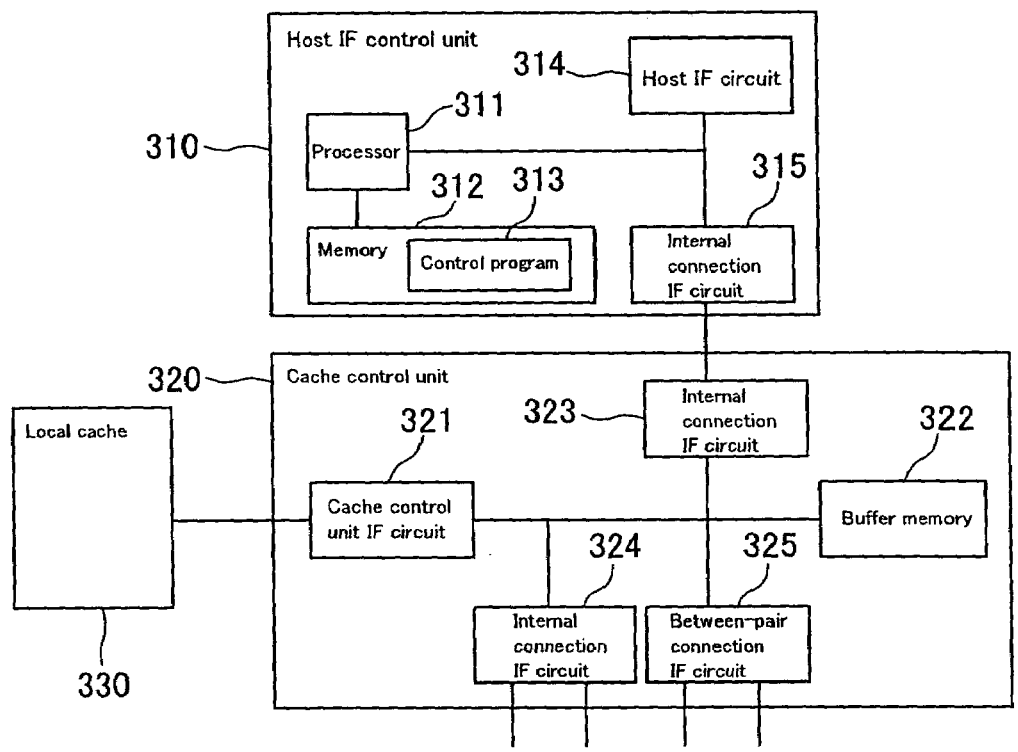
FIG. 3 is a block diagram showing the configuration of a host interface control unit and a cache control unit in accordance with the first example.

FIG. 3 is a block diagram showing the configuration of a host interface control unit 310 and a cache control unit 320.

The host control unit 310 comprises a processor 311, a memory 312, a host interface circuit 314 and an internal connection interface circuit 315.

A processor 311 receives requests for reading/writing of data from a host computer 200 by executing a control program 313 stored in a memory 312, and controls a disk control apparatus 100. The host interface circuit 314 is connected to the host computer 200 and constitutes a circuit for sending/receiving data. The internal connection interface circuit 315 constitutes a circuit for connecting with the cache control unit 320.

The cache control unit 320 comprises a cache control unit interface circuit 321, a buffer memory 322, an internal connection interface circuit 323 and 324, and a between-paired-caches interface circuit 325.

The cache control unit interface circuit 321 constitutes a circuit for connecting with the local cache 330 and controls the sending to/receiving from the local cache 330.

The buffer memory 322 is used for storing data temporarily when data is sent to/received from the local cache 330. The internal connection interface circuit 323 constitutes a circuit for connecting with the host interface control unit 310. The internal connection interface circuit 324 constitutes a circuit for connecting with the internal interface control unit 340.

Figure 4:
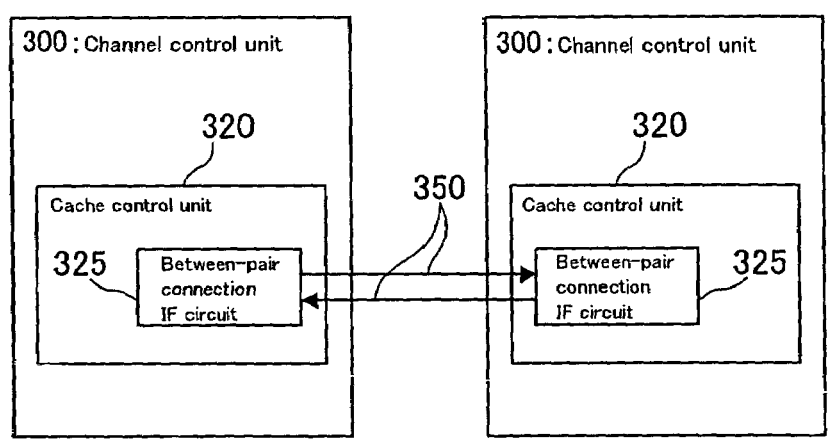
FIG. 4 is a block diagram showing the configuration of a channel control unit in accordance with the first example.

The between-paired-caches interface circuit 325 is connected with the cache control unit 320 of a channel control unit 300 to be paired therewith. The mode of connection is shown in FIG. 4.

The channel control unit 300 to be paired therewith executes the duplication of data by sharing the data in each other's local cache 330. Commands and data for executing the duplication of data are sent to the channel control unit 300 of the other one of the pair. The between-paired-caches interface circuits 325 within a pair are connected directly with each other by a between-paired-caches connection unit 350. The between-paired-caches connection unit 350 is a communication path provided dedicatedly for duplicating data in each other's local cache 330 within the pair. Therefore, data duplication can be executed at a high speed since data communication between the paired local caches 330 can be executed without being influenced by other processes.

Since this duplication is executed between paired channel control units, maintenance operations for channel control units can be carried out without influencing the operation of the storage control apparatus. For example, assume a case where a channel control unit with a fault is replaced. If the channel control unit is not paired with another one and duplicates data within the channel control unit itself, it is necessary to save the data stored in the cache memory onto other storage area than that in the channel control unit before replacing the channel control unit. However, in the case of this embodiment, the saving of data is not necessary because the data is also stored in a cache memory of the other channel control unit paired therewith. Thus, it is possible to carry out the maintenance and management operation of the storage control apparatus that is required to continuously operate for 24 hours and 365 days without stopping its operation and degrading its functions.

The configurations of circuits of the internal connection interface circuit 315, the internal connection interface circuits 323 and 324, and the between-paired-caches connection interface circuit 325 may be either combination of the circuits of same kind, the circuits of different kinds, or mixture of the circuits of same kind and different kinds.

Figure 5:
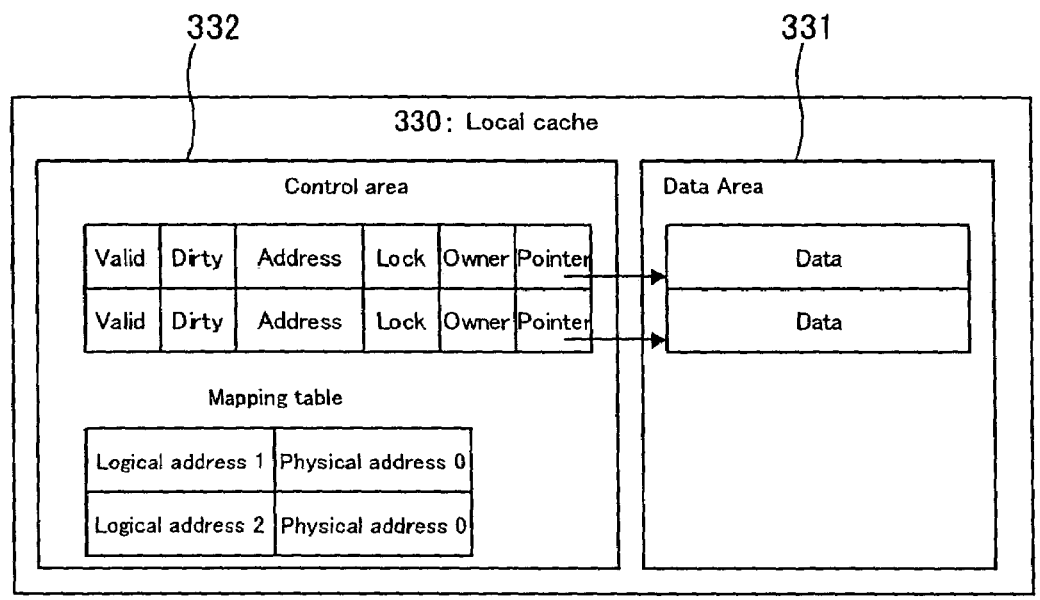
FIG. 5 is a block diagram showing the configuration of a local cache memory in accordance with the first example.

Next, FIG. 5 is a block diagram showing the configuration of the local cache memory 330.

The local cache memory 330 comprises the data area 331 and a control area 332. Data read out from the storage device 800 by the host computer 200 is temporarily stored in the data area 331. A table for managing the data stored in the data area 331 is stored in the control area 332. Data is managed by providing a table having columns of "Valid", "Dirty", "Address", "Lock", "Owner" and "Pointer" for each data block stored in the data area 331.

It is possible to store data blocks stored in the data area 331 in any unit. They are not limited to be in units such as unit of block, unit of cylinder or unit of track in the storage device 800. Furthermore, the size of a data block may either be a variable length or a fixed length.

The column, "Valid" indicates whether the data in the data block is valid or not. When a read-out request for data has been issued from the host computer 200, even though the data can be found in the data area 331, the cache access results in a miss hit if the data is not valid.

The column, "Dirty" indicates whether data read out by the local cache 330 was rewritten or not by the host computer 200. If the data was rewritten, it is necessary to write the data back in the storage device 800. If the data was not rewritten, it is not necessary to write the data back in the storage device 800.

The column, "Address" indicates storage positions of data stored in the local cache 330. The host computer 200 designates data with logical addresses when it reads out data. Therefore, logical addresses are described in the column, "Address". However, in the disk control apparatus 100 of this embodiment, a mapping table is provided in the control area since the global cache 600 is managed with physical addresses. Data transfer between the local cache 330 and the global cache 600 is enabled by executing an exchange of logical addresses for the physical addresses referring to the mapping table.

The column, "Lock" indicates that a process for the data stored in a pair of local caches 330 mutually therebetween is prohibited. Data of each of the paired local caches 330 is duplicated between them mutually at a high speed through the between-pair connection unit 350 being a communication path dedicated for data duplication but the duplication can not be achieved at the same time. Therefore, inconsistency of data occurs between the paired caches for very short time, though. If the data has been replaced from, for example, the local cache (has been written back in the global cache 600) during the occurrence of the inconsistency between the paired caches, erred data likely to be stored in the global cache 600 and the storage device 800. The column, "Lock" is provided in order to prevent such a problem and the operation to the data is prohibited while the Lock is effective.

The column, "Owner" indicates which of the paired local caches 330 possesses the data. The column, "Owner" is provided for managing which one the data belongs to since data is stored in a duplicated manner between the paired caches mutually.

The column, "Pointer" is a column for managing the correspondence between the data stored in the data area 331 and management information stored in the control area 332.

Figure 6:
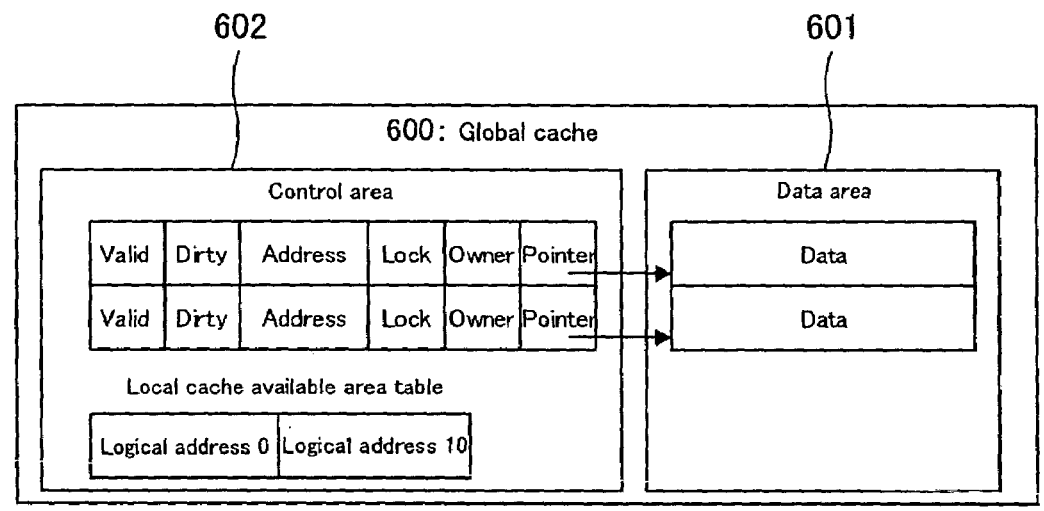
FIG. 6 is a block diagram showing the configuration of a global cache memory in accordance with the first example.

Next, FIG. 6 is a block diagram showing the configuration of the global cache 600.

The basic configuration is same as the configuration of the global cache 330 but the meanings represented by the column, "Lock" and the column, "Owner" are different.

The column, "Lock" indicates that the data on the global cache 600 is in a state that the data is prohibited from being read out to another local cache 330 since the data has been read out to the local cache 330 and the data is likely to be updated by the host computer 200. If a plurality of local caches 330 are allowed to read out the data, the consistency between data can not be assured since each piece of data is likely to be updated respectively by the host computer 200.

The column, "Owner" indicates which local cache 330 is being read out the data.

The global cache 600 is connected to the internal connector unit 500 and two global caches 600, being paired, execute duplication of data. The duplication of data between the paired global caches 600 is realized by transferring each other's data mutually between them through the internal connector unit 500.

Figure 7:
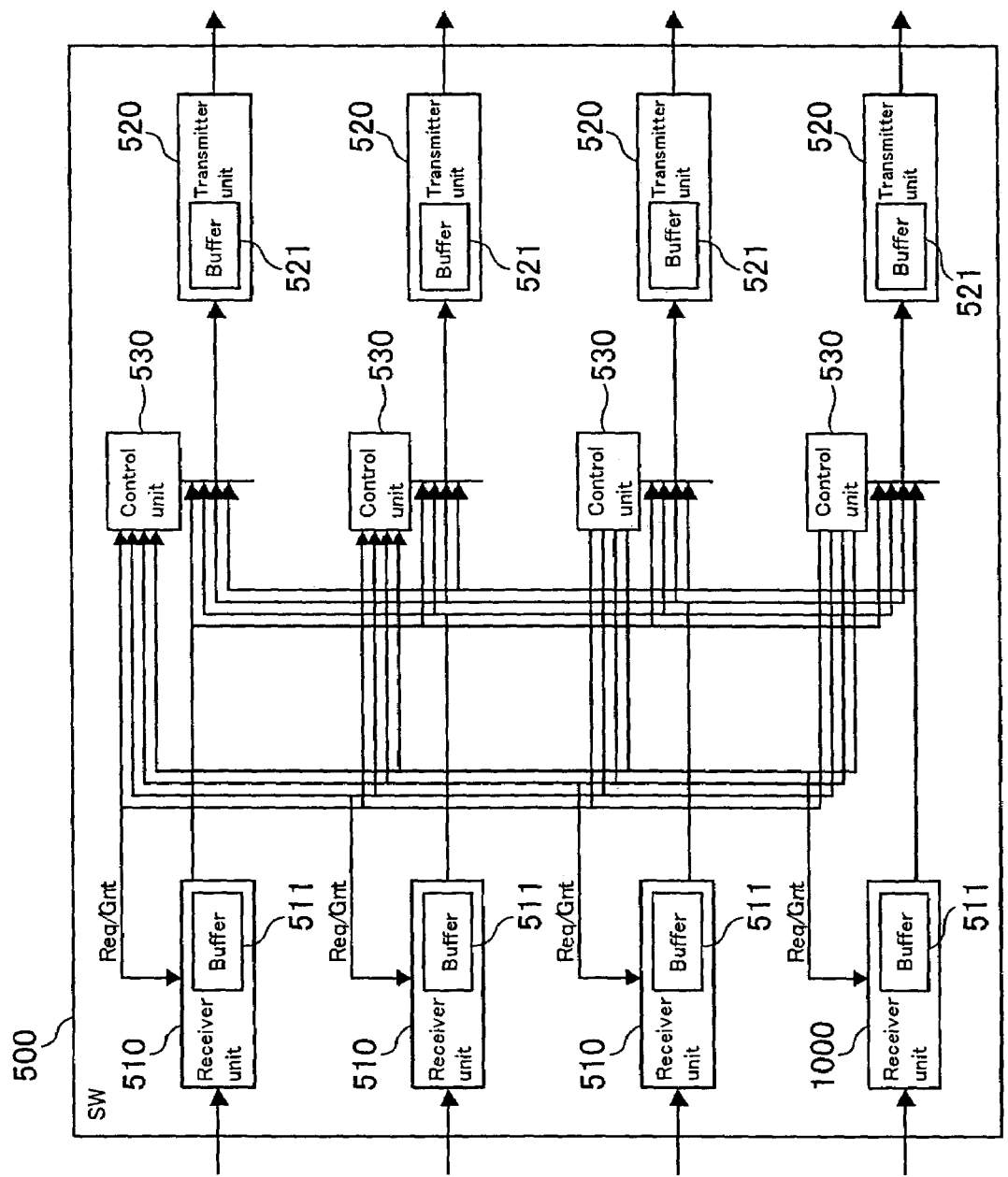
FIG. 7 is a block diagram showing the configuration of an internal connection unit in accordance with the first example.

Next, FIG. 7 is a block diagram showing the configuration of the internal connector unit 500.

An example of a 4-input-4-output type is shown in FIG. 7 but the internal connector unit 500 according to the embodiment is an 8-input-8-output type. However, an example of 4-input-4-output type will be described for simplification of the description since their basic configurations are same.

The internal connector unit 500 comprises a receiver unit 510, a transmitter unit 520 and a control unit 530 The receiver unit 510 stores data input into the internal connector unit 500 in a buffer 511 as appropriate while it transfers the data to a buffer 521 of the transmitter unit 520 specified according to an order from the control unit 530. The transmitter unit 520 outputs data stored in the buffer 521 one by one. Though FIG. 7 shows a case where a configuration of a cross bar switch is employed as the internal connector unit 500, the unit is not limited to the configuration of a cross bar switch and the unit can take various configurations. For example, it is possible to adapt that the receiver unit 510 and the transmitter unit 520 are connected by a multi-stage switching circuit.

Since pieces of data duplicated mutually between two global caches 600 are transferred through the internal connector unit 500, there are many transfer paths and contention on the paths may occur. Therefore, relatively long time is necessary for duplicating data stored in global caches 600. On the other hand, since data duplicated between local caches 330 is directly linked at the between-pair connection unit 350, paths for transferring are short and there are no contention on the paths. Therefore, data duplication can be executed in a brief period of time.

Figure 8:
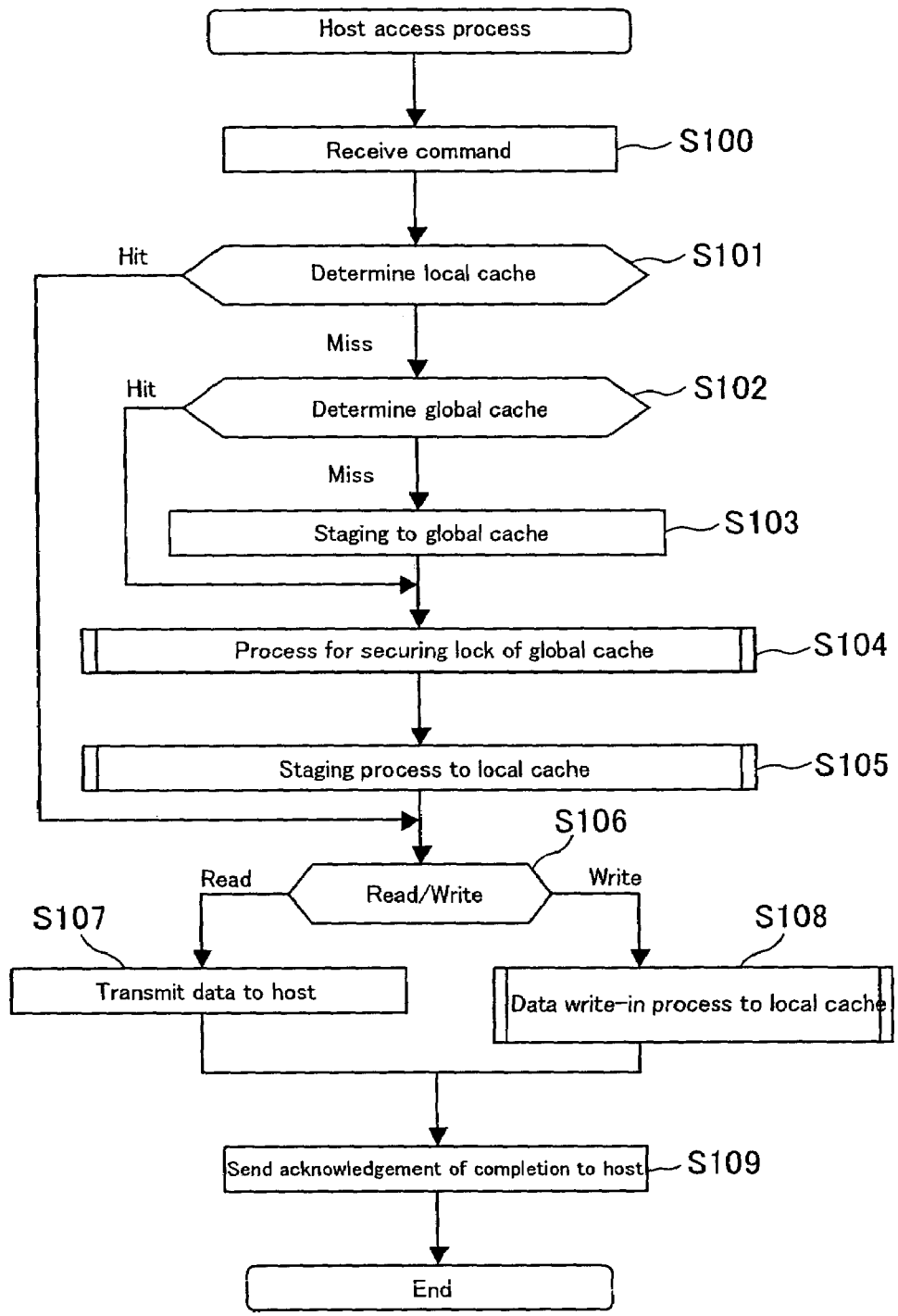
FIG. 8 is a flowchart showing a data access process in accordance with the first example.

Next, FIG. 8 is a flowchart showing the flow of a process for the case where a data access request is issued from the host computer 200 to a disk control apparatus 100 according to this embodiment.

When a data access request is issued from the host computer 200 to the channel control unit 300 (Step S100), the processor 311 of the host interface control unit 310 analyzes the access request. The type of access (read-out request, write-in request), the address of the data to be accessed etc. are determined from the analysis.

Then, the processor 311 transmits the commands listed in FIGS. 9A-9F to the cache control unit interface circuit 321 of the cache control unit 320 in response to the type of access. The command listed in FIG. 9D is transmitted in the case of a read-out request and the command listed in FIG. 9A and the command (data) listed in FIG. 9B are transmitted in the case of a write-in request.

The cache control unit interface circuit 321 retrieves management information stored in the control area 332 of the local cache 330 according to a command transmitted from the processor 311 and verifies whether the data at the address specified in the command is stored in the local cache 330 (Step S101).

In the case where the data is stored in the local cache 330, if the request is a read-out request, the cache control unit interface circuit 321 reads out the data from the local cache 330 and transmits the data to the host computer 200. (Step S106, Step S107). Having received an acknowledgement (ACK) of the completion of the read-out process from the local cache 330, the cache control unit interface circuit 321 transmits a status to the processor 311. The status to be transmitted is a command denoted by FIG. 9F. Finally, the processor 311 sends to the host computer 200 a read-out process completion acknowledgement (Step 5109) and the process is finished.

In this embodiment, the case where the cache control unit interface circuit 321 executes the retrieval of the management information of the control area 332 of the local cache 330, and the control such as the read-out of data from the local cache 330 is described as an example. However, an aspect in which the processor 311 executes such processes is also possible. In this case, it is possible to adapt such that the retrieval of the management information stored in the local cache 330 can be executed in a higher speed by copying the management information stored in the control area 332 into the memory 312 by the processor 331.

The details will be described later but, as to the data access control to the global cache 600, an aspect also can be possible in which the processor 311 executes the control, not limiting to an aspect in which the cache control unit interface circuit 321 executes the control.

Figure 15:
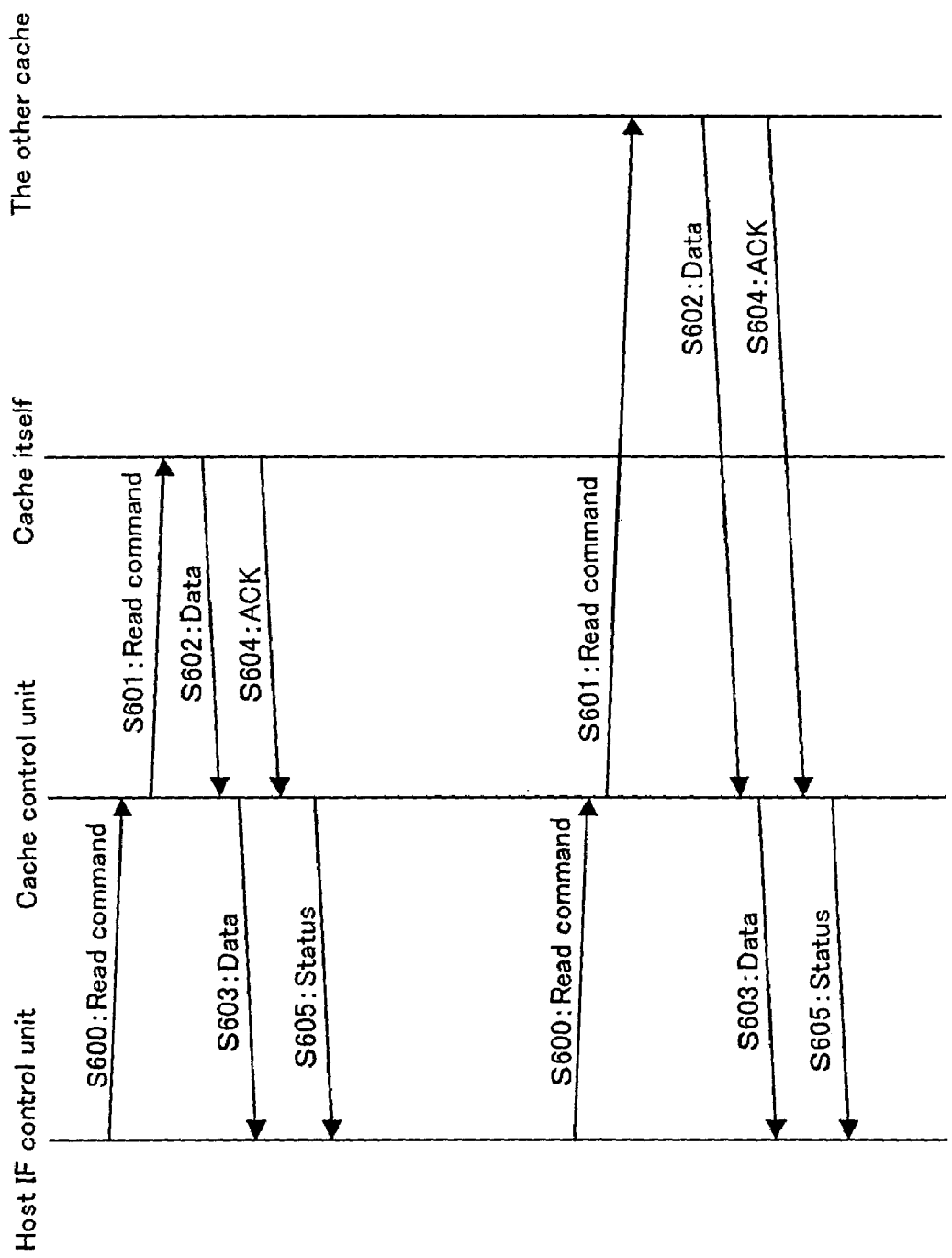
FIG. 15 is a flowchart showing a data read-out process from the local cache memory in accordance with the first example.

FIG. 15 is a flowchart in which the process of the above read-out request is shown. As shown in FIG. 15, two local caches 330 are paired but neither of them executes any access to each other's local cache 330 when data is being read out.

On the other hand, for the case where the access request from the host computer 200 is a write-in request, the cache control unit interface circuit 321 writes into the local cache 330 the data stored in the buffer memory 322, transmitted from the host computer 200 (Step S108).

Figure 14:
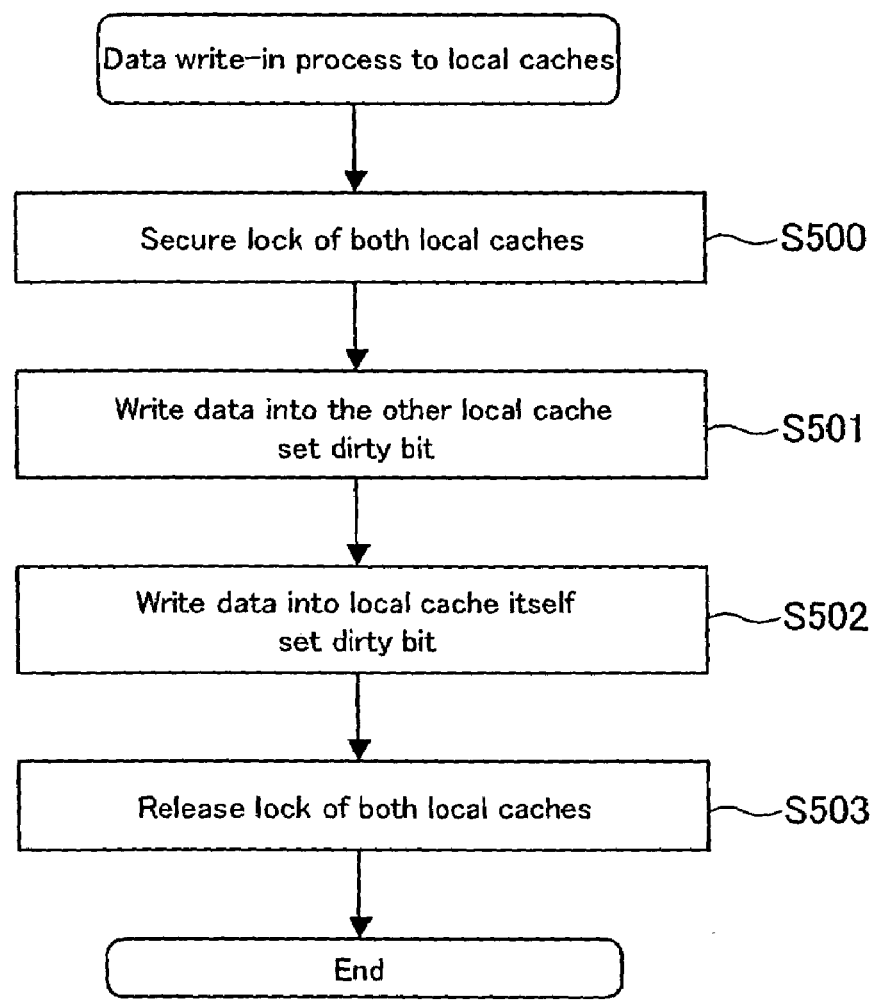
FIG. 14 is a flowchart showing a data write-in process to the local cache memory in accordance with the first example.

FIG. 14 shows the details of a write-in process into the local cache 330. First, the cache control unit interface circuit 321 issues a request to lock the local cache 330 to the other cache control unit interface circuit 321 that is paired therewith.

Figure 11:
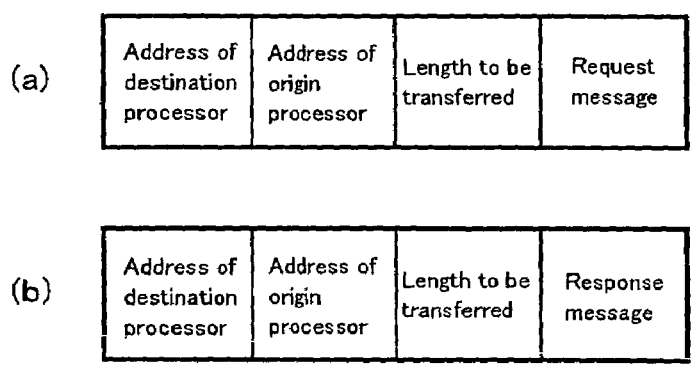
FIG. 11 shows commands for executing the data access process in accordance with the first example.

This request is executed by sending a command listed in FIG. 11A through the between-pair connection unit 350. When it is secured that both of the local caches 330 are locked after receiving a response of lock acknowledgement (a command listed in FIG. 11B) from the counter part of the pair (Step S500), the cache control unit interface circuit 321 transmits the data to be written stored in the buffer memory 322, to a buffer memory 350 of the counter part through the between-pair connection unit 350. Then, the write-in process is executed to the local cache 330 of the other cache control unit interface circuit 321 by the other cache control unit interface circuit 321 (Step S501).

Figure 16:
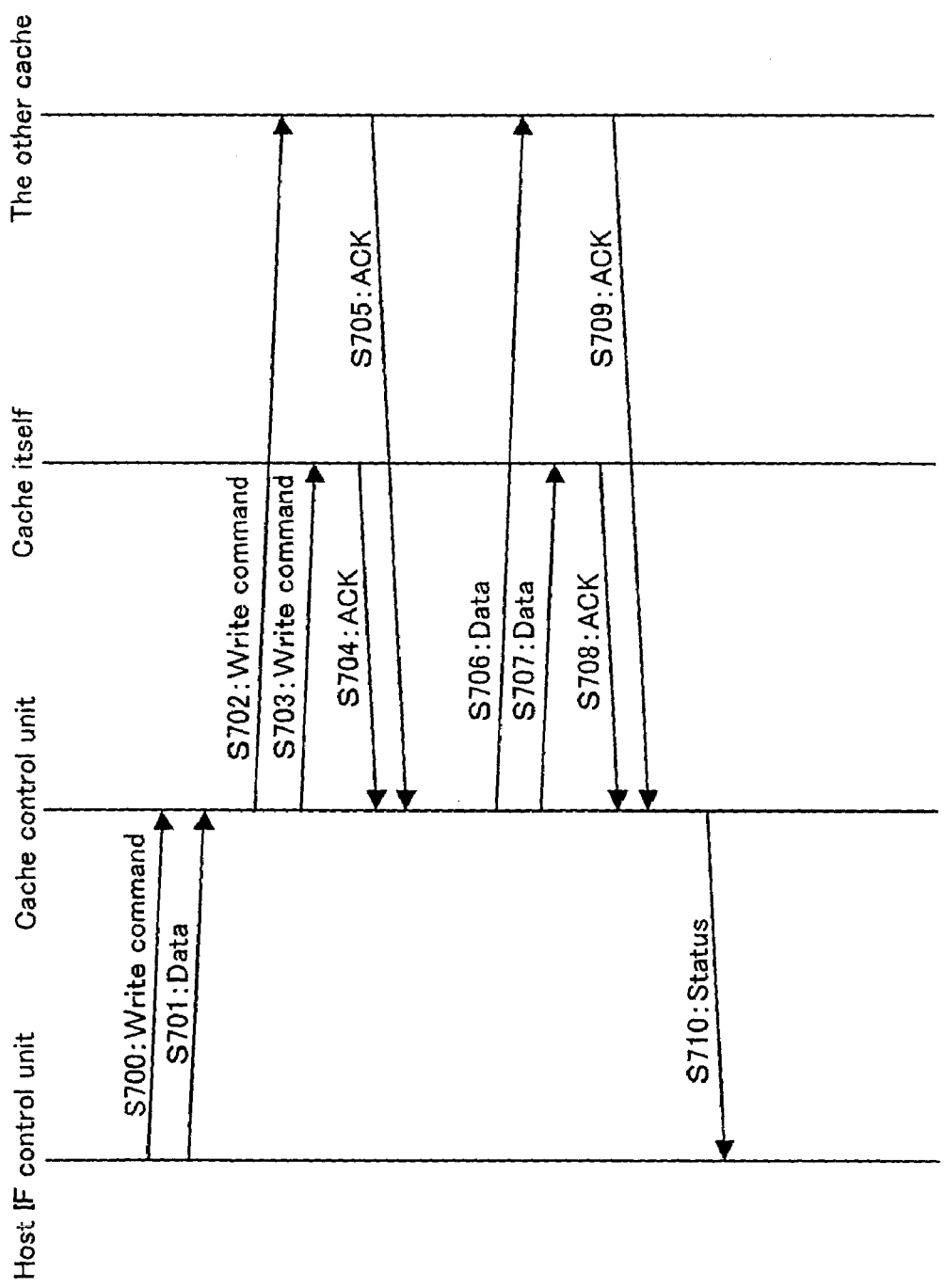
FIG. 16 is a flowchart showing a data write-in process to the local cache memory in accordance with the first example.

Then, the data is written in the local cache 330 by the local cache 330 itself (Step S502). A check is put to the column, "Dirty" in the control area 322 when the data is written in the local cache 330. When data write-in process for both of the local caches 330 have been completed, after unlocking the lock, a completion acknowledgement is sent to the host computer 200 and the process is finished (Step S503, Step S109). A flowchart in which the above process for the write-in request is represented is shown in FIG. 16.

Since the host computer 200 can not execute a process to be the next one until it receives a completion acknowledgement from the disk control apparatus 100, it is an important point for improving the performance how quickly a disk control apparatus 100 returns a completion acknowledgement to a host computer 200. In a disk control apparatus 100 according to this embodiment, a data write-in process for the other local cache 330 in a pair can be executed without being influenced by other processes by executing the process through a between-pair connection unit 350 being a dedicated communication path.

Furthermore, the activity ratio of the internal connector unit 500 can be suppressed since transferring of data for duplication of data between local caches 330 is executed without using the internal connector unit 500. Therefore, contention of data in the internal connector unit 500 can be alleviated and data access responses to a host computer 200 can be sent at a high speed.

Next, a process for a case where data is not present in a local cache 330 though an access request for the data is received from a host computer 200, i.e., a cache miss hit will be described.

In this case, whether the requested data is present in the global cache 600 is verified (Step S102). First, a cache control unit interface circuit 321 obtains a physical address referring to the mapping table in the control area 332 based on the logical address of the data specified in a command transmitted from the processor 311. Then, the cache control unit interface circuit 321 transmits the command to the global cache 600 through the internal connection unit 500 and retrieves the management information stored in the control area 602 of the global cache 600 and verifies whether the data is stored in the global cache 600.

If the data is not present in the global cache 600, the cache control unit interface circuit 321 transmits the command to the disk control unit 400, reads out the data from a storage device 800 and causes the global cache 600 to store the data (Step S103). The data stored in the global cache 600 is also sent to the other global cache 600 through the internal connector unit 500 and the data is duplicated.

In this case, it is possible for the aspect to be adapted such that the process for transferring as soon as possible to the host computer the data read out from the storage device 800 to the global cache 600 is caused to precede the duplication of the data on the global cache 600. Since the data on the global cache 600 is also stored in the storage device 800, there will be no problem if the data is lost on the global cache 600. The reliability of the data can be secured by executing the duplication when the data is updated.

Figure 10:
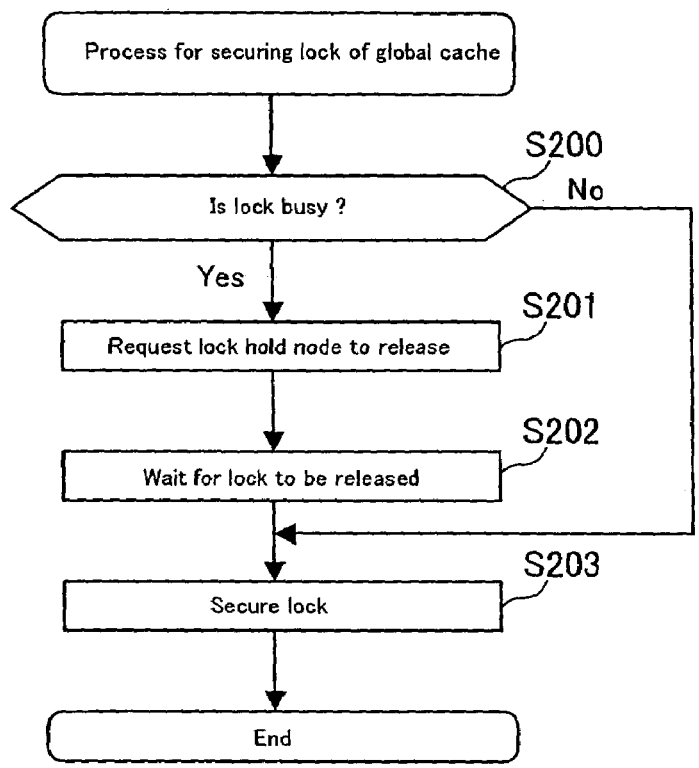
FIG. 10 is a flowchart showing a lock securing process of the global cache memory in accordance with the first example.

Next, the data is locked on the global cache 600 (Step S104). That is, the data on the global cache 600 is caused to prevent from being read out from another local cache 330. The flow of the above process is shown in the flowchart in FIG. 10.

In the case where the data has been already read out by another local cache 330 and is locked (Step S200), the local cache 330 is requested to release the lock (Step S201). Which local cache 330 has locked can be known from the column, "Owner" of the control area 602.

After waiting for the lock to be released (Step S202), the data is locked not to be read out from another local cache 330 and the process is finished (Step S203). If the other local cache 330 is not locked, it is locked at once and the process is finished (Step S200, Step S203).

Figure 12:
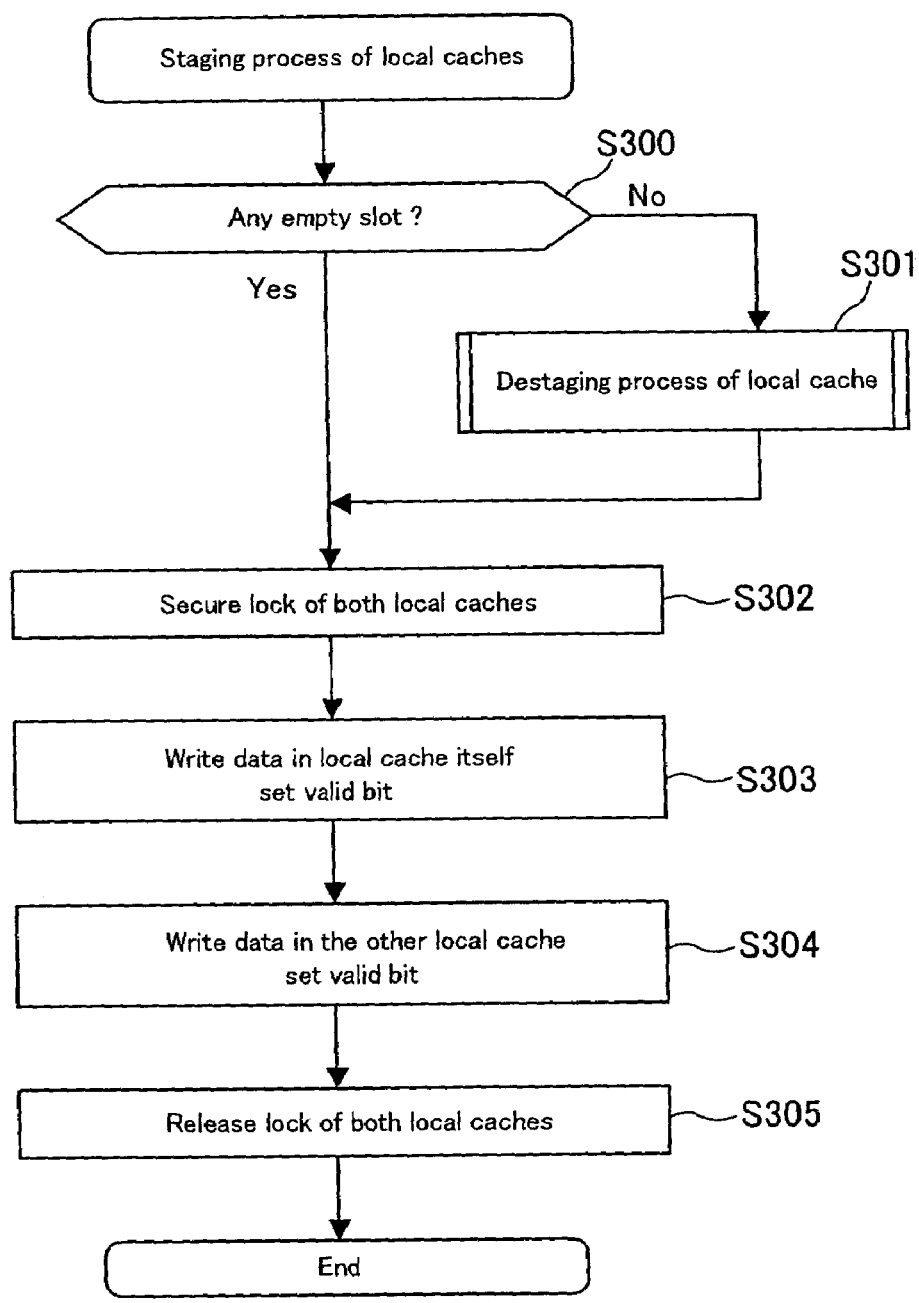
FIG. 12 is a flowchart showing a staging process of the local cache memory in accordance with the first example.

Next, a process in which the data stored in the global cache 600 is read out to a local cache 330 (Step S105). The flow of the process is shown in the flowchart in FIG. 12.

First, before the data is transferred from the global cache 600 to the local cache 330, whether an empty area for writing the data in is present on the local cache 330 is checked (Step S300). This process can be executed by checking whether the total amount of the invalid data is larger than the amount of the data transferred from the global cache 600 by retrieving the column, "Valid" of the control area 332.

When there is an enough empty capacity, first, the cache control unit interface circuit 321 secures locking by sending to the other cache control unit interface circuit 321 in the pair a request to lock the local cache 330 (Step S302). Next, the cache control unit interface circuit 321 stores the data from the global cache 600 to the buffer memory 322, and transmits the data to the other buffer memory 350 in the pair through the between-pair connection unit 350 and simultaneously writes the data into its own local cache 330 (Step S303, Step S304). When writing the data into each other's local caches 330 has been completed, the lock is caused to be released and the process is finished (Step S305). The processes following this are executed as described above in response to an access request from the host computer 200 (Step S106 to S109).

Figure 13:
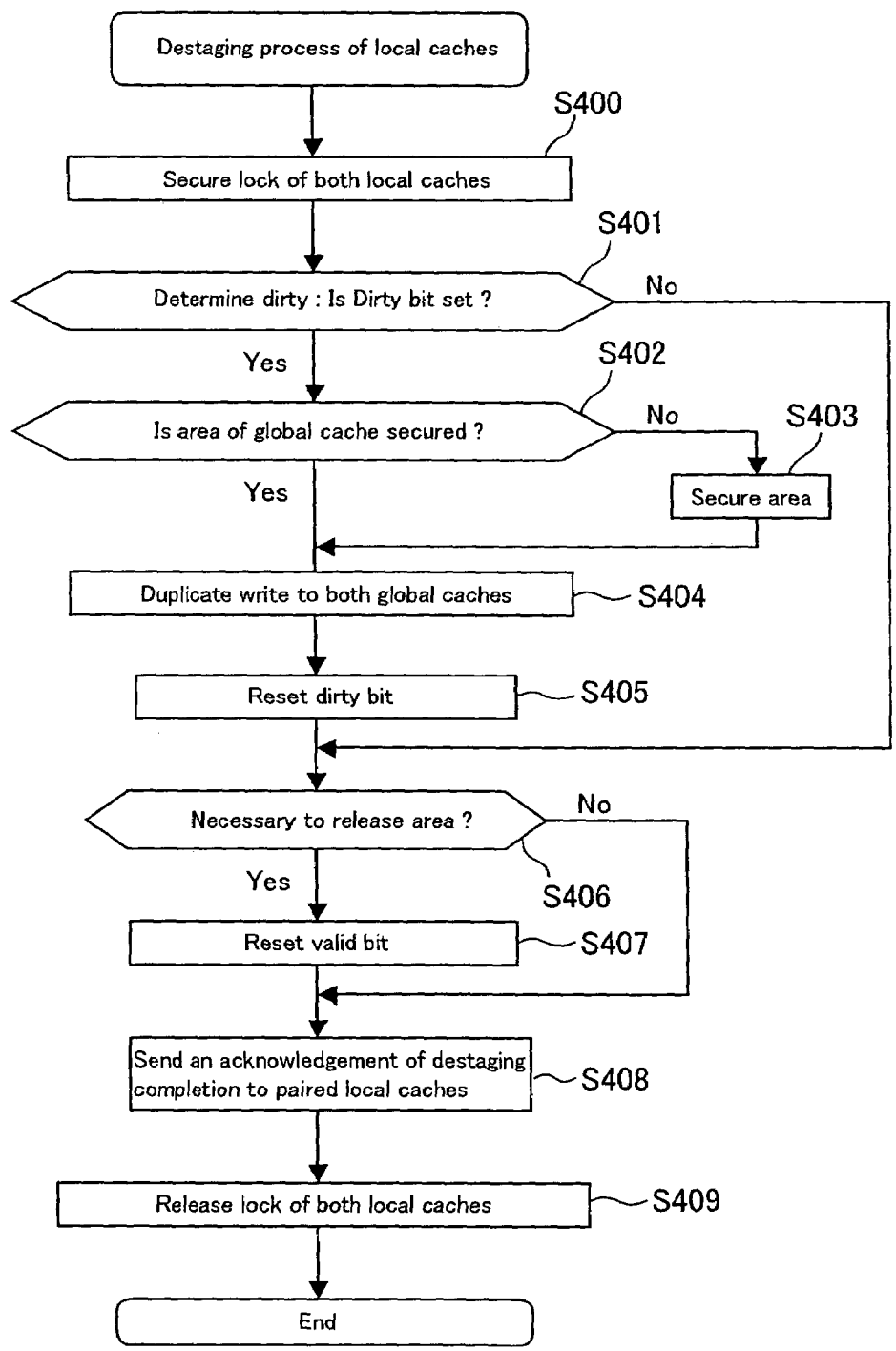
FIG. 13 is a flowchart showing a destaging process of the local cache memory in accordance with the first example.

If there is no empty area for the data to be transferred from the global cache 600 to the local cache 330, a process is necessary in which an empty area is secured by writing any piece of data on the local cache 330 back into the global cache 600 (Step S301). The flow of the process is shown in the flowchart in FIG. 13.

First, the cache control unit interface circuit 321 secures locking by sending to the other cache control unit interface circuit 321 in the pair a request to lock the local cache 330 (Step S400). Next, the cache control unit interface circuit 321 checks using the control area 332 a Dirty bit of the data written out to the global cache 600 identified according to a predetermined algorithm (Step S401). As a predetermined algorithm, the Least Recently Used (LRU) scheme in which the data that has not been accessed for the longest time is written out from the cache is common but another algorithm may be used.

It is not necessary to write out the data to the global cache 600 if a Dirty bit is not set. However, since it is necessary to write out the data to the global cache 600 if the Dirty bit is set, whether there is any empty area to write in the data in the global cache 600 is checked (Step S402). If there is no enough empty area in the global cache 600, an area is secured by writing some data stored in the global cache 600 out to the storage device 800 (Step S403).

Next, the data is written in the emptied area on the global cache 600 from the local cache 330 (Step S404). The write-out process is executed to two (2) global caches 600. After the data is written out to the global caches 600, the data is not "dirty" any more and the Dirty bit is reset (Step S405). Then, if it is necessary to release an area on the local cache 330 where the data is stored (Step S406), the Valid bit of the data is reset (Step S407).

Then, an acknowledgement notifying that the read-out process of the data to the global cache 600 has been completed is sent to the other local cache 330 in the pair (Step S408). On receiving this acknowledgement, in the other local cache 330 in the pair, the Valid bit in the control area 332 is reset. Finally, the lock of the local cache 330 is released (Step S409) and the process is finished.

Figure 17:
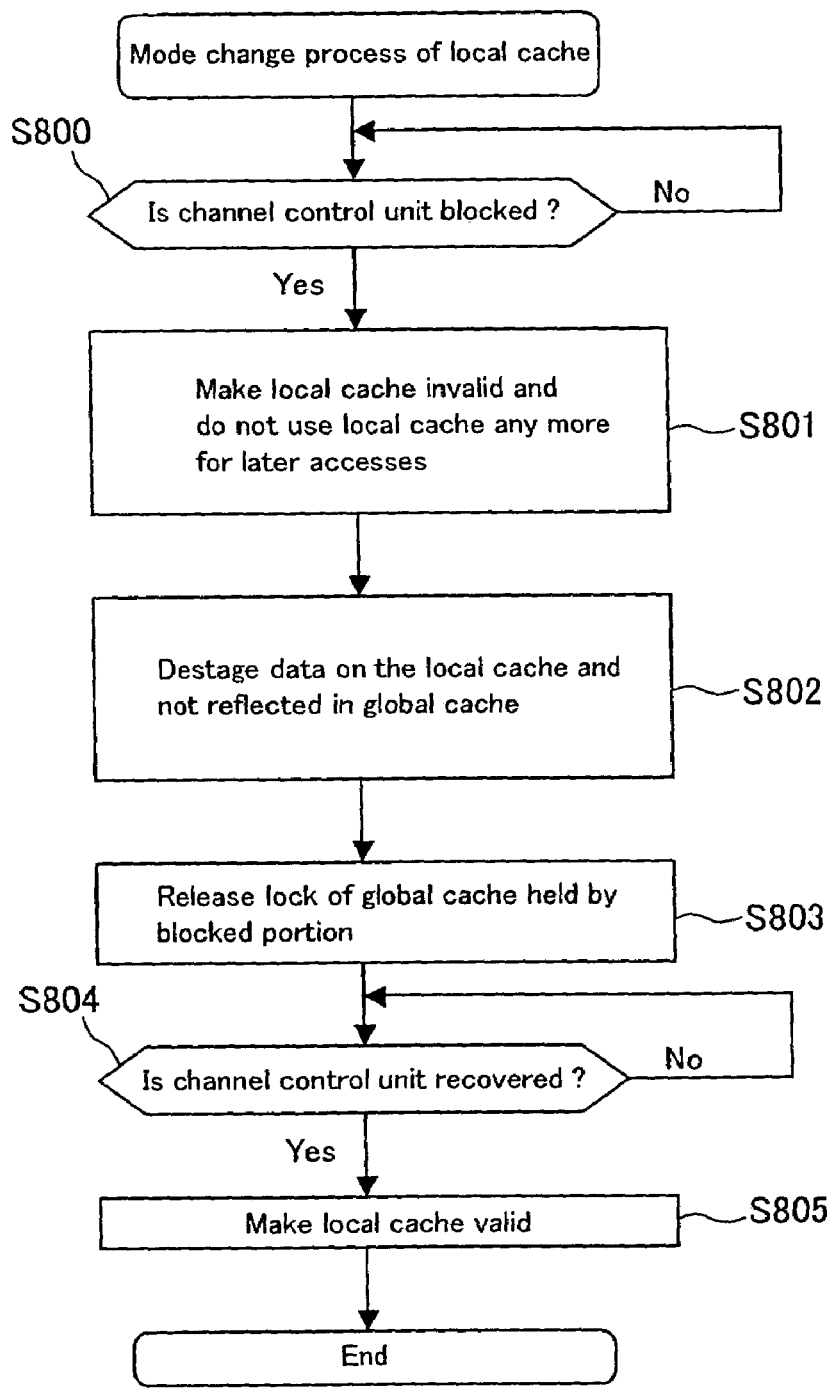
FIG. 17 is a flowchart showing handling for a case where a fault occurs in the channel control unit in accordance with the first example.

Next, a process for the case where a fault occurs to the channel control unit is shown in the flowchart in FIG. 17.

First, the processor 311 in the host interface control unit 310 always monitors whether there is any abnormality in the channel control unit 300 (Step S800). When the processor 311 detects any abnormality in the channel control unit 300, it does not use the local cache 330 any more and makes the local cache 330 invalid (Step S801). Then, data already stored in the local cache 330 is written out on the global cache 600 (Step S802).

The data written out in this case is the data for which the Dirty bit is set. Next, the lock of the data written out from the local cache 330 is released on the global cache 600 (Step S803). This is for enabling the data to be read out to another local cache 330. Keeping this state, the operation of the system stops and waits for the channel control unit 300 to recover to be normal (Step S804). However, the data accesses from the host computer 200 during this waiting are continued by the other channel control unit 300 paired with the channel control unit 300. When the channel control unit 300 recovers to be normal, the local cache 330 is made valid and its use is resumed (Step S805).

Thereby, the work can be continued without stopping the operation of the system by using the other channel control unit 300 in the pair even when a fault occurs to the channel control unit 300.

Figure 18:
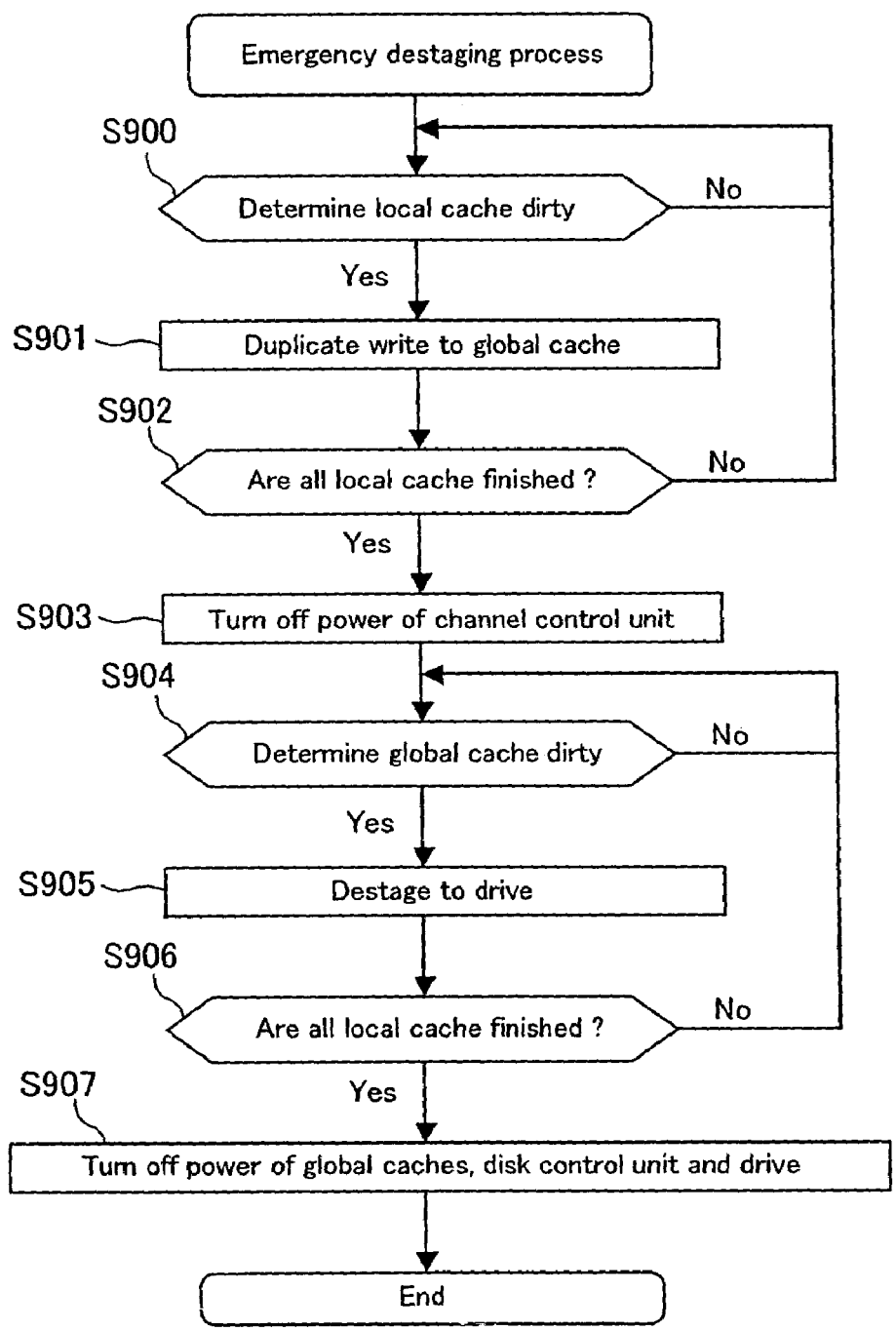
FIG. 18 is a flowchart showing an emergency destaging process in the storage control apparatus in accordance with the first example.

Next, FIG. 18 is a flowchart showing an emergency de staging process in the storage control apparatus 100 according to this embodiment.

The emergency destaging process is a technique for protecting the data stored in cache memories when the supply of power to the disk control apparatuses 100 is stopped due to a sudden power-down etc. Power is supplied from the battery 700 during a power-down. However, since the power consumption of the disk control apparatus 100 is not little, the supply of power from the battery 700 can not be maintained for a long time. Therefore, the emergency destaging process is required to be completed in a brief period of time as far as possible.

The disk control apparatuses 100 start the emergency destaging process when they detect that the supply of power is switched to the supply of power from the battery. First, the disk control apparatuses 100 research whether there is some data, among the data stored in the local cache 330, that is not yet reflected to the global cache 600, by retrieving Dirty bits in the control area 332 (Step S900).

The data not yet reflected to the global cache 600 is written out to two (2) global caches 600 (Step S901). When the process to write out all the "dirty" data to the global cache 600 is completed (Step S902), the power source of the channel control unit 300 is blocked (Step S903). This is for reducing the power consumption as little as possible and for maintaining the power supply by the battery 700 as long as possible.

Next, the disk control apparatuses 100 research whether there is some data, among the data stored in the global cache 600, that is not yet reflected to the storage device 800, by retrieving Dirty bits in the control area 602 (Step S904). The data not yet reflected to the storage device 800 is written out to the storage device 800 through the disk control unit 400 (Step S905). When the process to write out all the "dirty" data to the storage device 800 is completed (Step S906), the power sources of the global cache 600, the disk control unit 400 and the storage device 800 are blocked (Step S907) and the process is finished.

Not only the aspect in which the supply of power to the entire channel control unit 300 is blocked in Step S903 but also an aspect in which the supply of power to a portion of the channel control unit 300 is blocked andl the supply of power to the channel control unit 300 is reduced may be employed. For example, an aspect in which the total supply of power is reduced by blocking the supply of power to the processor 311, the part consuming relatively large power among the channel control unit 300, may be employed.

By executing such a process, it is possible to improve the reliability of the system without losing the data on the cache memories even when a sudden power-down occurs.

In this manner, the process for the case where a data access request is issued from a host computer 200 to a disk control apparatus 100 is executed.

Thereby, the reliability of data can be improved since the data stored in a local cache 330 and a global cache 600 is duplicated.

Furthermore, each host computer 200 can access cache memories without competing with data accesses from other host computers 200 and high speed data accesses can be realized since the local caches 330 are deployed in a distributed manner in each channel control unit 300.

Furthermore, the overhead of the duplication process of data can be reduced since the local caches being paired for the duplication of data are connected by a dedicated between-pair connection unit 350 and, therefore, further higher speed for data accesses from the host computers 200 can be realized. Furthermore, the activity ratio of the internal connector unit 500 can be suppressed since data transfer for the duplication of data between the local caches 330 is executed without using the internal connector unit 500. Therefore, data competition in the internal connector unit 500 is reduced and data access responses to the host computers 200 can be executed at a higher speed.

Yet furthermore, conventionally, it is necessary to access a magnetic disk to read out the data requested from a host computer 200 when the data is not present in a cache memory. However, in the disk control apparatus 100 according to this example, data accesses from the host computers 200 can be made at a higher speed since it is not necessary to access a magnetic disk to read out data when the data is present in the global cache 600 even if the data is not present in the local caches 330.

Yet furthermore, it is not necessary to access the storage device 800 to read out data to be accessed from a host computer 200 when the data is stored in the global cache 600 even if the data is not stored in the local cache 330. Therefore, the access speed from the host computers 200 can be made higher.

Second Example

In the disk control apparatus 100 according to the first example, an aspect in which the between-pair connection unit 350 is not provided can be considered. Even in such an aspect, duplication of data can be executed at a higher speed by carrying out the communication between paired two (2) local caches 330 at a higher rate.

That is, for the case where no between-pair connection unit 350 is provided, the communication between the two local caches 330 is carried out through the internal connector unit 500. However, it is possible to carry out the data transfer as if the paired two (2) local caches 330 were connected by a dedicated communication path, by carrying out the data transfers from the receiver unit 510 connected with the channel control unit 300 to the transmitter unit 520, preceding other data transfers or dedicatedly in the circuit shown in FIG. 7. Thereby, data transfers between the paired components can be carried out at a higher speed without being influenced by other data transfers, and is same as shown in disk control apparatus 100 in the first embodiment.

Third Example

Figure 19:
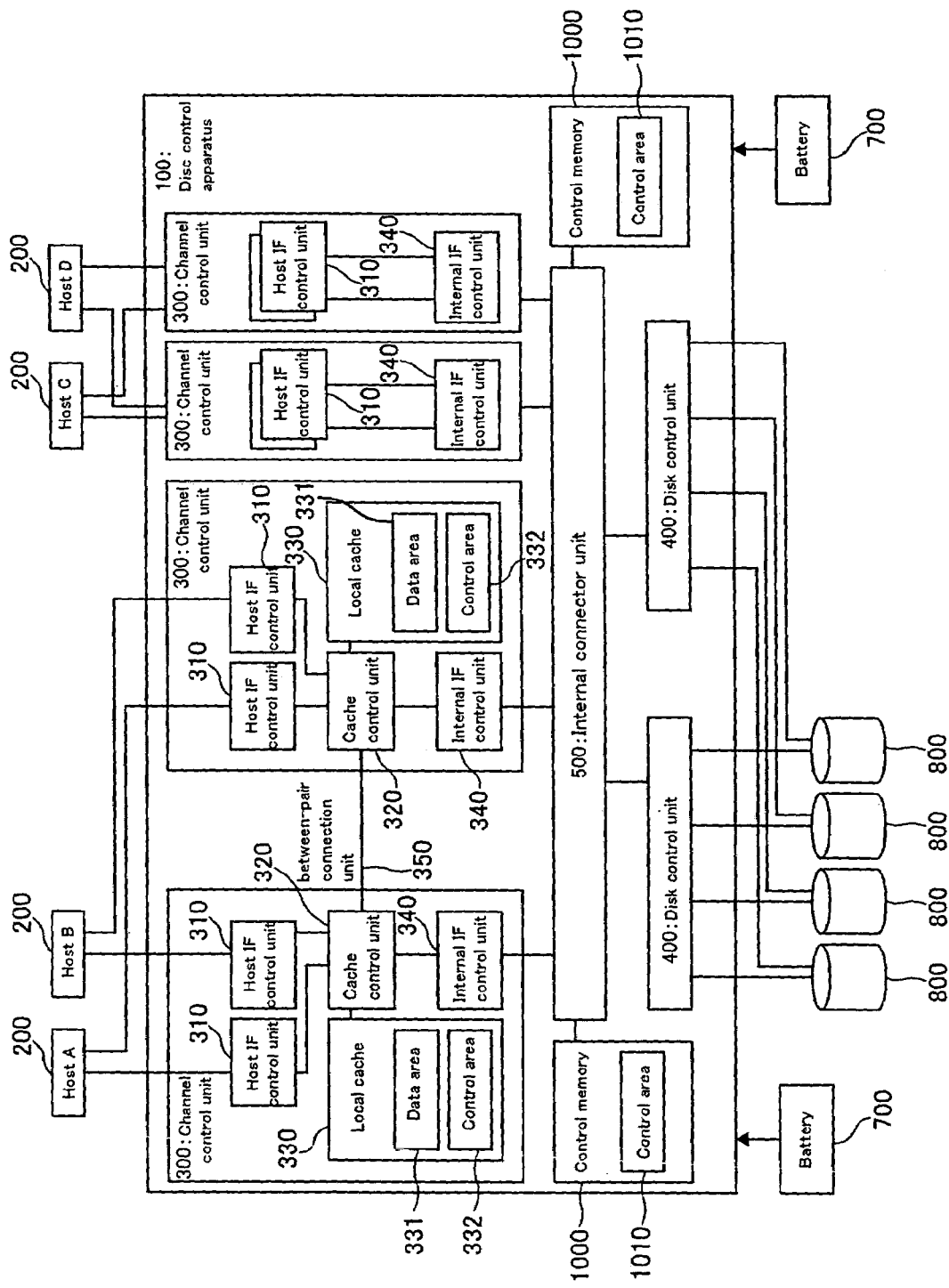
FIG. 19 is a block diagram showing the entire configuration of a computer system in accordance with a third example.

Next, FIG. 19 is a block diagram showing the entire configuration of a computer system according to a third example.

As the third example, an aspect in which the global cache 600 is not present for the disk control apparatus 100 according to the first example is shown. In such an aspect, a control memory 100 is provided to the internal connector unit 500 in order to manage data read out to a certain local cache 330, not to be read out to another local cache 330.

Figure 20:
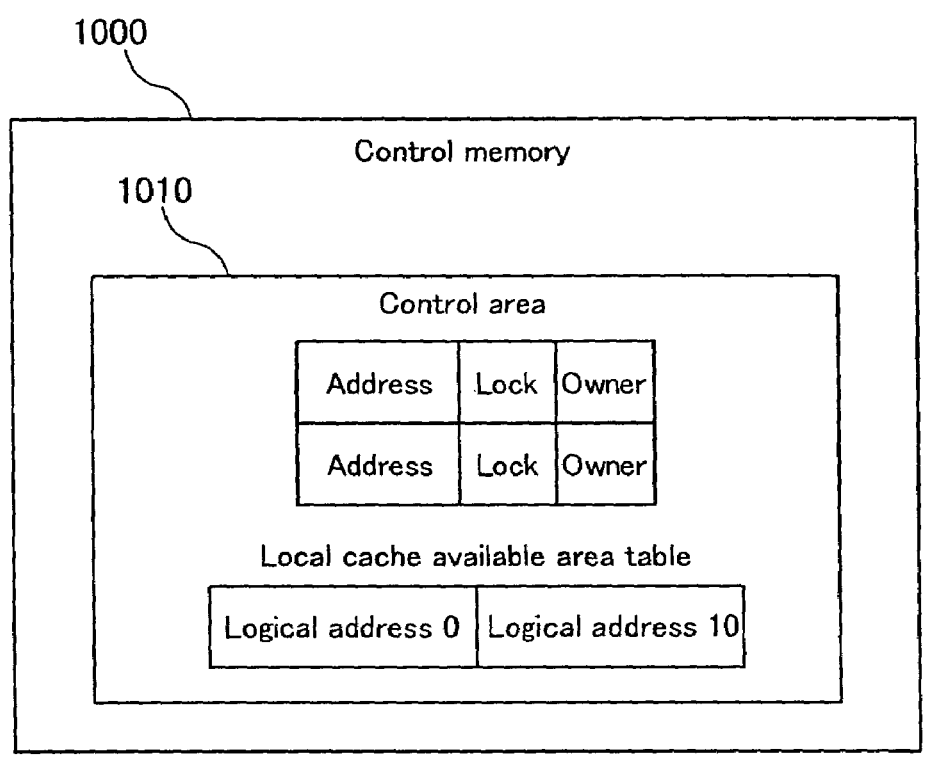
FIG. 20 is a block diagram showing the configuration of a control memory in accordance with the third example.

The configuration of a control memory 1000 is shown in FIG. 20.

The control memory 1000 has a control area 1010 for managing data already read out to the local cache 330. The control area 1010 comprises columns, "Address", "Lock" and "Owner".

The column, "Address" indicates physical address information of the data already read out to the local cache 330. The column, "Lock" indicates a state where reading out of the data already read out to the local cache 330, to other local caches 330 is prohibited since the data specified in the column, "Address" has been already read out to the local cache 330 and maybe updated by the host computer 200. This is because, if reading out of the data to a plurality of local caches 330 is allowed, each of those read out pieces of data may be updated respectively and independently and the consistency of data can not be assured. The column, "Owner" indicates a local cache 330 being reading out the data.

The additional configuration for the disk control apparatus 100 according to the third example is same as that of the disk control apparatus 100 according to the first example.

Figure 21:
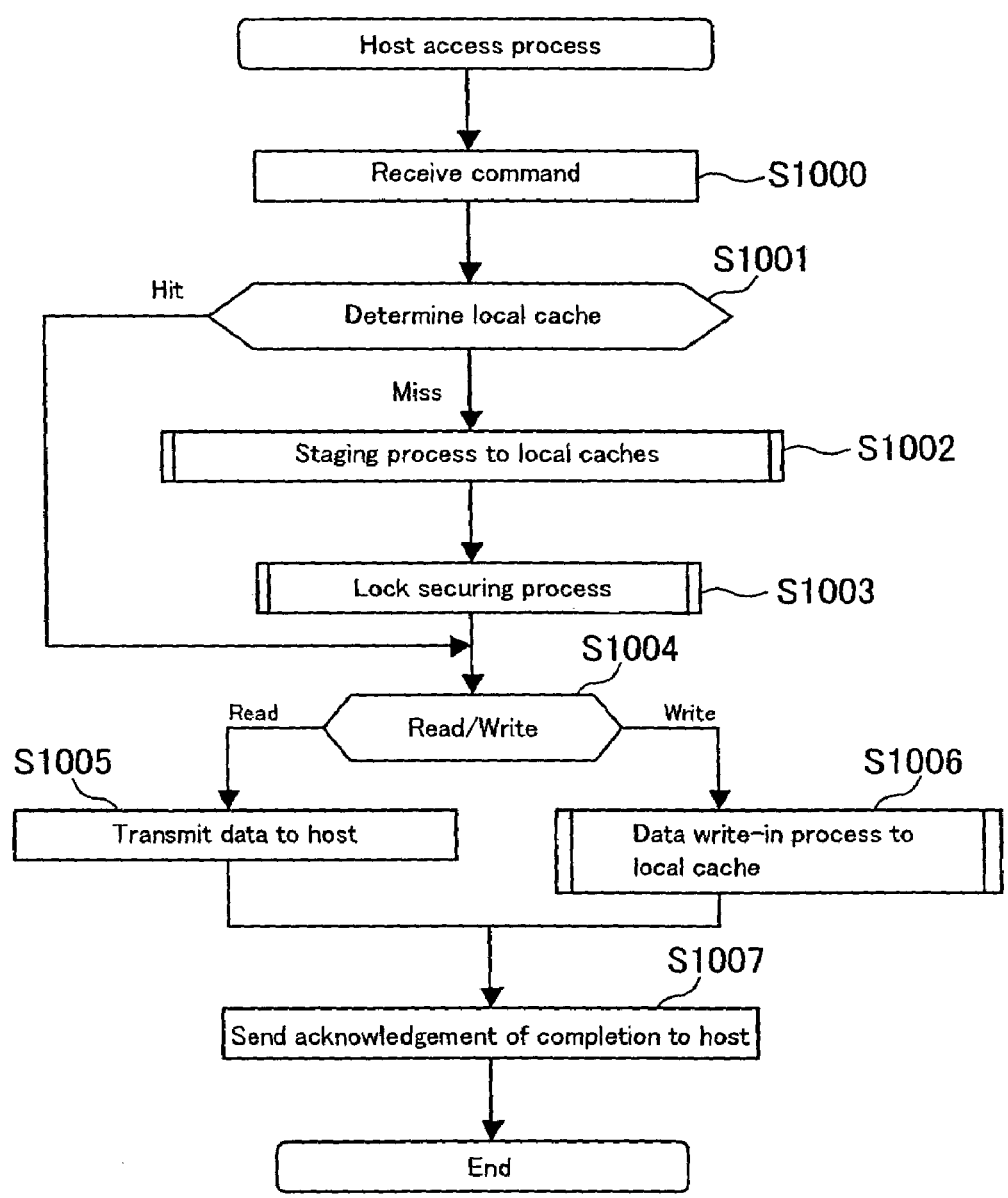
FIG. 21 is a flowchart showing a data access process in accordance with the third example.

Next, FIG. 21 shows a flowchart showing the flow of the process for the case where a data access request is issued to the disk control apparatus 100 from a host computer 200 according to this example. When an access request for data is issued from the host computer 200 to a channel control unit 300 (Step S1000), the processor 311 of the host interface control unit 310 analyzes the access request. The type of-access (read-out request, write-in request), the address of the data to be accessed etc. are determined from the analysis.

Then, the processor 311 transmits a command listed in FIG. 9 to the cache control unit interface circuit 321 of the cache control unit 320 in response to the type of the access. The command listed in (d) in FIG. 9 is transmitted for the case of a read-out request and the command listed in (a) and the command (data) listed in (b) in FIG. 9 are transmitted for the case of a write-in request.

The cache control unit interface circuit 321 retrieves the management information stored in the control area 332 of the local cache 330 according to the command transmitted from the processor 311 and verifies whether the data at the address specified in the command is stored in the local cache 330 (Step S1001).

In the case where the data is stored in the local cache 330, if the request is a read-out request, the cache control unit interface circuit 321 reads out the data from the local cache 330 and transmits the data to the host computer 200 (Step S1004, Step S1005). Having received an acknowledgement (ACK) of the completion of the read-out process from the local cache 330, the cache control unit interface circuit 321 transmits a status to the processor 311. The status to be transmitted is a command denoted by (f) in FIG. 9. Finally, the processor 311 sends to the host computer 200 a read-out process completion acknowledgement (Step S1007) and the process is finished.

On the other hand, for the case where the access request from the host computer 200 is a write-in request, the cache control unit interface circuit 321 writes into the local cache 330 the data stored in the buffer memory 322 having been transmitted from the host computer 200 (Step S1006).

Figure 25:
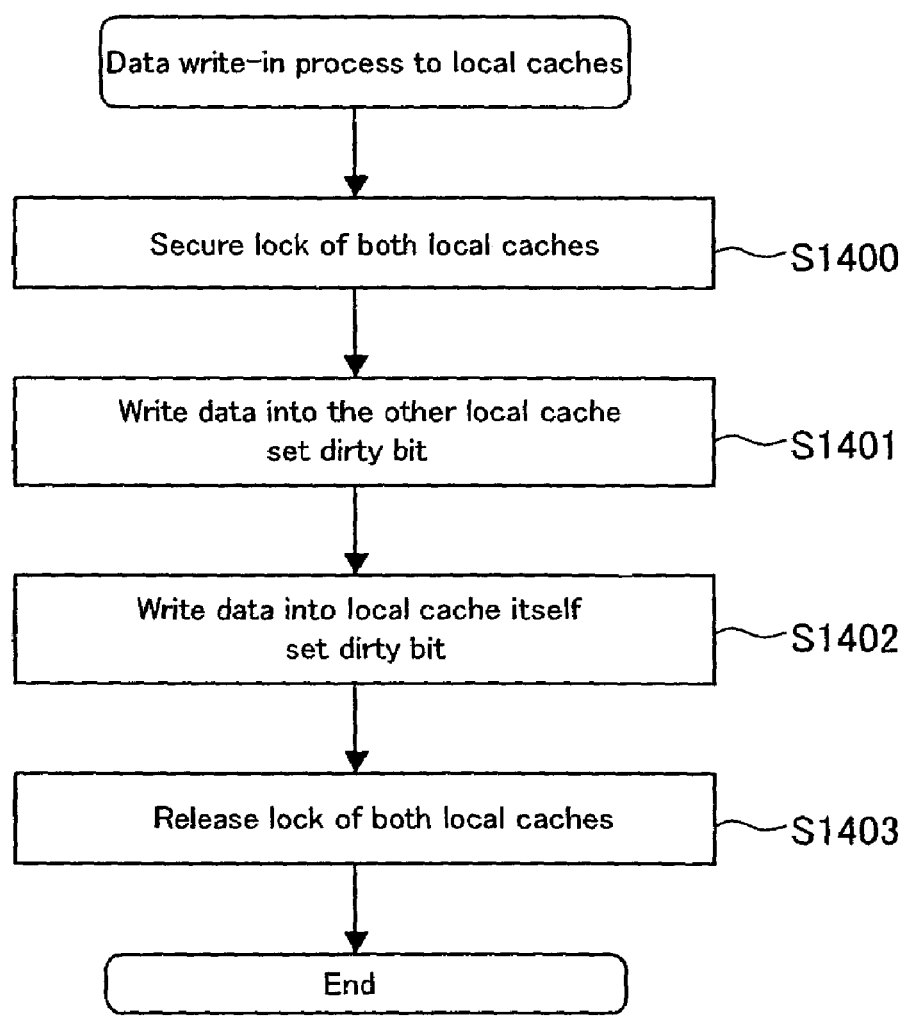
FIG. 25 is a flowchart showing a data write-in process to the local cache memory in accordance with the third example.

The details of the write-in process to the local cache 330 are shown in FIG. 25. That is, first, the cache control unit interface circuit 321 sends a request to the other cache control unit interface circuit 321 in the pair to lock the local cache 330. This request is executed by transmitting the command listed in (a) in FIG. 11 through the between-pair connection unit 350. Having received from the counter part a response (the command listed in (b) in FIG. 11) indicating that the lock has been secured and, having secured the lock of both local caches 330 in the pair (Step S1400), the cache control unit interface circuit 321 transmits the data stored in the buffer memory 322 to the buffer memory 350 of the counter part through the between-pair connection unit 350. Then, a write-in process is executed to the local cache 330 of the counter part by the cache control unit interface circuit 321 of the counter part (Step S1401). Then, a write-in process is executed to the local cache 330 itself (Step S1402). When the data is written in the local cache 330, a check is put to the column, "Dirty" of the control area 322. When the write-in processes to both of the local caches 330 in the pair have been completed, after the lock is released, an acknowledgement of completion is transmitted to the host computer 200 and the process is finished (Step S1403, Step S1007).

Since the host computer 200 can not execute the following processes until it receives the acknowledgement of completion from the disk control-apparatus 100, it is an important point for the disk control apparatus 100 to return an acknowledgement of completion to the host computer 200 as quickly as possible. In the disk control apparatus 100 according to this example, write-in processes of data to the other local cache 330 in the pair can be executed at a high speed without being influenced by other processes by executing the write-in processes through the between-pair connection unit 350 being a dedicated communication path.

Figure 23:
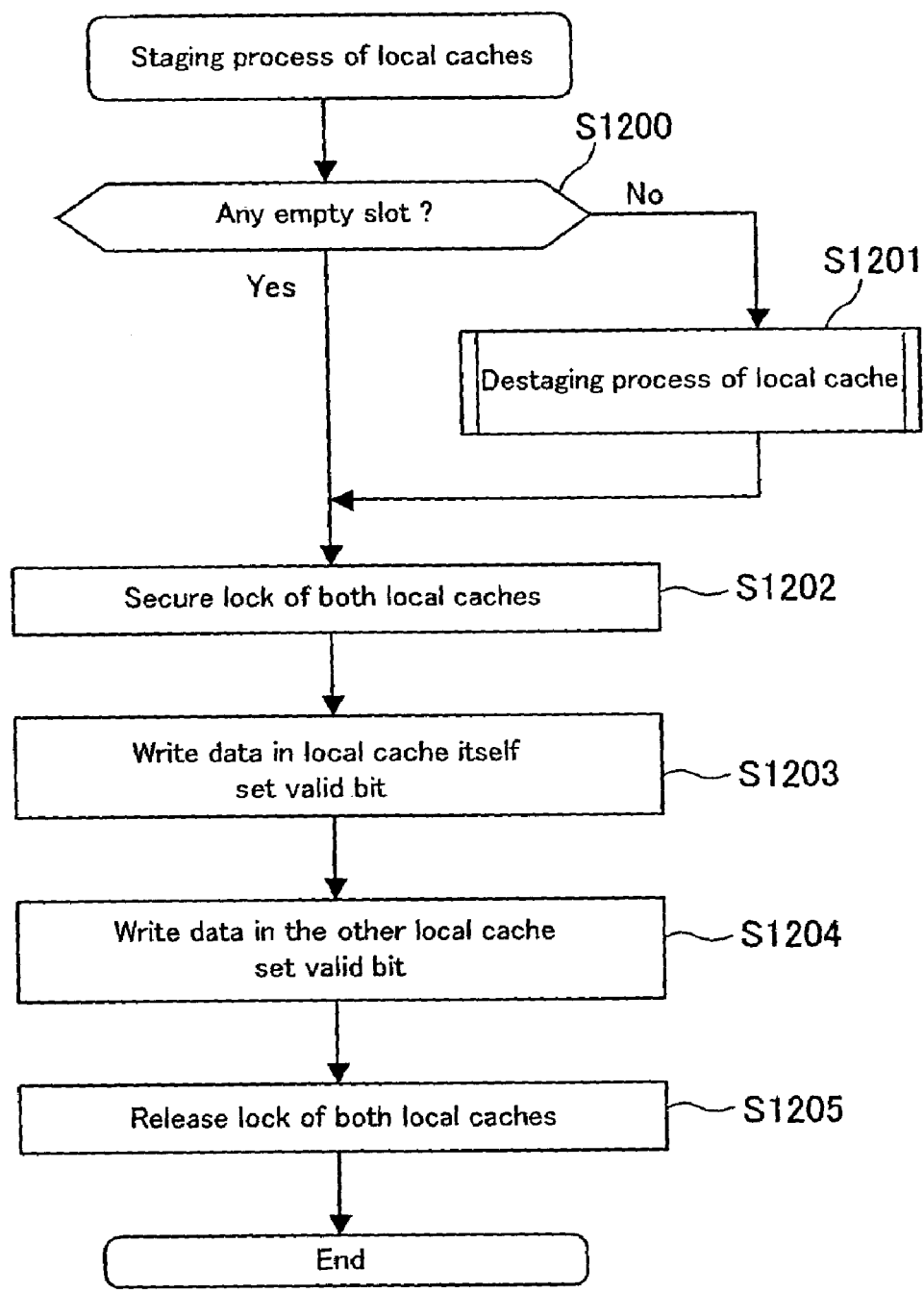
FIG. 23 is a flowchart showing a staging process of a local cache memory in accordance with the third example.

Next, a process for the case where the data in not present in the local cache 330 though an access request for the data is received from a host computer 200, that is, a cache miss hit will be described. In this case, a process for reading out to the local cache 330 the data stored in a storage device 800 is executed (Step S1002). The flow of the process is shown in FIG. 23.

First, before the data is transferred from the storage device 800 to the local cache 330, whether an empty area for writing the data in is present on the local cache 330 is checked (Step S1200). This process can be executed by checking whether the total amount of the invalid data is larger than the amount of the data transferred from the storage device 800 by retrieving the column, "Valid" of the control area 332.

When there is a sufficient empty capacity, first, the cache control unit interface circuit 321 secures locking by sending to the other cache control unit interface circuit 321 in the pair a request to lock the local cache 330 (Step S1202). Next, the cache control unit interface circuit 321 stores the data from the storage device 800 to the buffer memory 322, and transmits the data to the other buffer memory 350 in the pair through the between-pair connection unit 350 and simultaneously writes the data into its own local cache 330 (Step S1203, Step S1204). When writing the data into each other's local caches 330 has been completed, the lock is caused to be released and the process is finished (Step S1205). The processes following this are executed as described above in response to access requests from the host computer 200 (Step S1004 to Step S1007).

Figure 24:
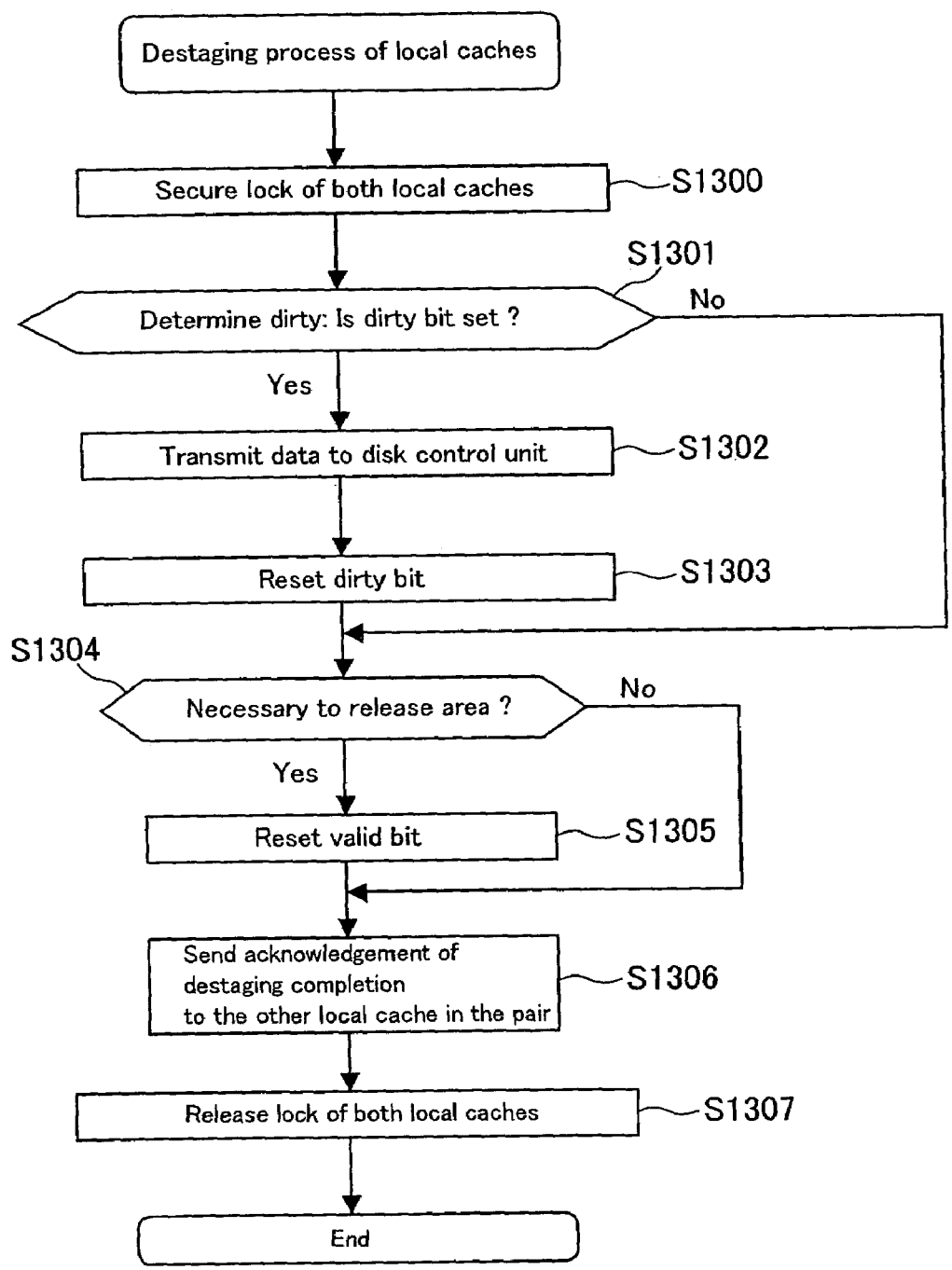
FIG. 24 is a flowchart showing a destaging process of the local cache memory in accordance with the third example.

If there is no empty area for the data to be transferred from the storage device 800 to the local cache 330, a process is necessary in which an empty area is secured by writing any piece of data on the local cache 330 back in the storage device 800 (Step S1201). The flow of the process is shown in the flowchart in FIG. 24.

First, the cache control unit interface circuit 321 secures locking by sending to the other cache control unit interface circuit 321 in the pair a request to lock the local cache 330 (Step S1300). Next, the cache control unit interface circuit 321 checks using the control area 332 a Dirty bit of the data written out to the storage device 800 identified according to a predetermined algorithm (Step S1301). As a predetermined algorithm, LRU scheme in which the data that has not been accessed for the longest time is written out from the cache is common but another algorithm may be used.

It is not necessary to write out the data to the storage device 800 if a Dirty bit is not set. However, the data is written out from the local cache 330 to the storage device 800 if the Dirty bit is set (Step 1302). The writing-out process is executed through a disk control unit 400. After the data has been written out to the storage device 800, the data is not "dirty" any more and the Dirty bit is reset (Step S1303). Then, when it is necessary to open an area on the local cache 330 where the data was stored (Step S104), the Valid bit of the data is reset (Step S1305).

Then, an acknowledgement notifying that the read-out process of the data to the storage device 800 has been completed is sent to the other local cache 330 in the pair (Step S1306) on receiving this acknowledgement, in the other local cache 330 in the pair, the Valid bit in the control area 332 is reset. Finally, the lock of the local cache 330 is released (Step S1307) and the process is finished.

Figure 22:
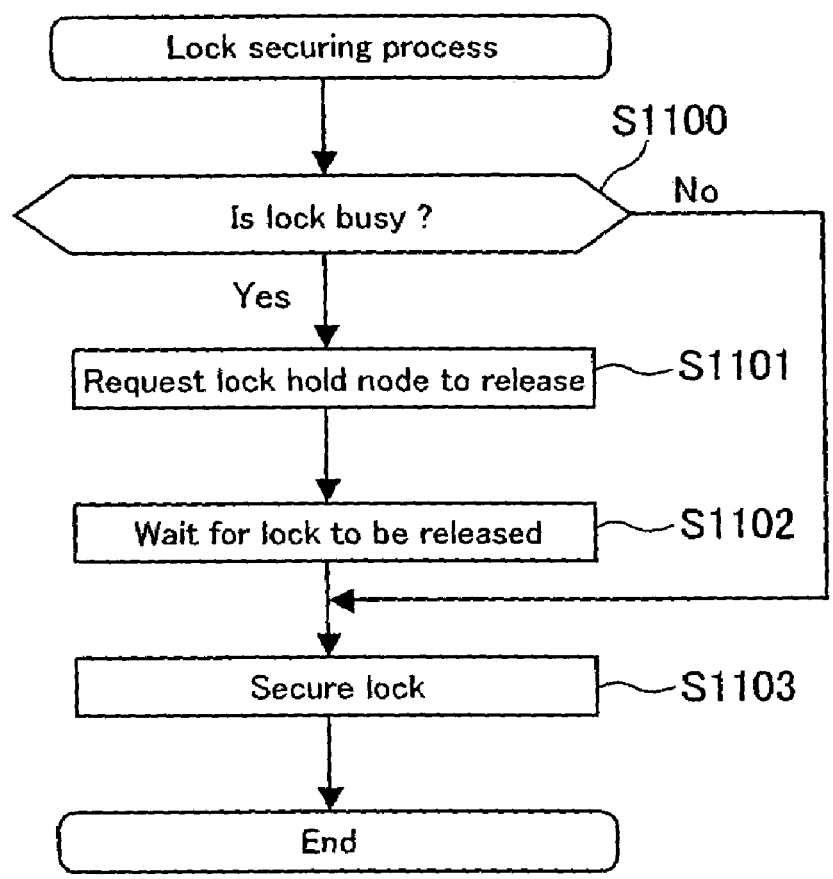
FIG. 22 is a flowchart showing a lock securing process in accordance with the third example.

In this manner, the data read out to the local cache 330 is locked in the control memory 1000 (Step S1003). That is, the data read out to the local cache 330 is prevented from being read out by another local cache 330. The flow of the process is shown in the flowchart in FIG. 22.

In the case where the data has been already read out to another local cache 330 and is locked (Step S1100), the local cache 330 is requested to release the lock (Step S1101). Which local cache 330 has locked can be known from the column, "Owner" of the control area 1010. After waiting for the lock to be released (Step S1102), the data is locked not to be read out from another local cache 330 and the process is finished (Step S1103). If the other local cache 330 is not locked, it is locked at once and the process is finished (Step S1100, Step S1103).

The processes following this are executed as described above in response to an access request from the host computer 200 (Step S1004 to S1007).

In this manner, a process for the case where a data access is issued from the host computer 200 to the disk control apparatus 100 is executed.

According to this, the reliability of the data is improved since the data to be stored in the local cache 330 is duplicated.

Furthermore, each host computer 200 can access cache memories without competing with data accesses requests from other host computers 200 and high speed data accesses can be realized since the local caches 330 are deployed in a distributed manner to each channel control unit 300.

Furthermore, the overhead of the duplication process of data can be reduced since the local caches being paired for the duplication of data are connected by a dedicated between-pair connection unit 350 and, therefore, further a higher speed for data accesses from the host computers 200 is realized. Yet furthermore, the activity ratio of the internal connector unit 500 can be suppressed since data transfer for the duplication of data between the local caches 330 is executed without using the internal connector unit 500. Therefore, data competition in the internal connector unit 500 can be reduced and data access responses to the host computers 200 can be executed at a higher speed.

According to these schemes described above, the access speed for data stored in cache memories of the storage control apparatuses can be made higher.

The examples according to the embodiments of the invention have hereinbefore been described. However, the above examples are only intended to facilitate the understanding of the invention but not to limit the interpretation of the invention. Any variations and modifications of the invention can be made without departing from the spirit and scope thereof, and the equivalents thereof are included in the invention.

What is claimed is:

1. A method for writing data to a cache memory wherein a data write-in request is issued from an information processor to a storage control apparatus, the storage control apparatus including a plurality of channel control units each having an interface with the information processor; a disk control unit having an interface with a storage device for storing data; a local cache memory disposed in each channel control unit for temporarily storing data to be interchanged between the information processor and the storage device; a dedicated data transfer path between at least two of the local cache memories; a connector unit to provide data paths among the plurality of channel control units and the disk control unit separate from the dedicated data transfer path; a global cache memory connected to the connector unit; and a disk drive connected to the global cache memory, the method comprising:

receiving data to be written from the information processor;

writing the data to be written to a first local cache memory of a first channel control unit, wherein if the first local cache memory does not have sufficient capacity to store the data to be written then first transmitting an amount of data stored in the first local cache memory to the global cache memory by way of the connector unit in order to obtain sufficient capacity in the local cache memory to store the data to be written;

transmitting the data to be written through the dedicated data transfer path to a second channel control unit connected to the first channel control unit;

writing the transmitted data to a second local cache memory of the second channel control unit;

receiving through the dedicated data transfer path an acknowledgement indicating that writing of the transmitted data to the second local cache memory disposed in the second channel control unit has completed;

transmitting the acknowledgement to the information processor to notify the information processor that data written to the second local cache memory of the second channel control unit has completed;

writing data in the first local cache memory and the second local cache memory which is not yet reflected to the global cache memory out to the global cache memory to reflect the data into the global cache memory;

removing power from the first channel control unit and the second channel control units after the data is reflected into the global cache memory;

writing data in the global cache memory which is not yet reflected to the disk drive out to the disk drive to reflect the data into the disk drive; and removing power from the global cache memory, the disk control unit, and the disk drive after the data is reflected to the disk drive.

2. A method in a storage control apparatus for reading in data stored in a second cache memory to a first cache memory, the storage control apparatus including a plurality of channel control units each having an interface with an information processor; a disk control unit having an interface with a storage device for storing data; a plurality of first cache memories each being disposed in one of the channel control units for temporarily storing data to be interchanged between the information processor and the storage device, the first cache memory of at least two of the channel control units being connected to one another through a dedicated data transfer path; a connector unit to provide data paths among the plurality of channel control units and the disk control unit separate from the dedicated data transfer path, the connector unit being connected to the second cache memory; a global cache memory connected to the connector unit; and a disk drive connected to the global cache memory, the method comprising:

transmitting a read-out command of the data to the second cache memory;

acquiring the data from the second cache memory;

writing the acquired data to a first cache memory of a first channel control unit, wherein if the first cache memory does not have sufficient capacity to store the acquired data then first transmitting an amount of data stored in the first cache memory to the second cache memory by way of the connector unit in order to obtain sufficient capacity in the first cache memory to store the acquired data;

transmitting the acquired data through the dedicated data transfer path from the first cache memory of the first channel control unit to the first cache memory of a second channel control unit;

receiving an acknowledgement from the second channel control unit indicating that the acquired data has been written to the first cache memory of the second channel control unit;

writing data in the first cache memory of the first channel control unit and the first cache memory of the second control unit which is not yet reflected to the global cache memory out to the global cache memory to reflect the data into the global cache memory;

removing power from the first channel control unit and the second channel control unit after the data is reflected into the global cache memory;

writing data in the global cache memory which is not yet reflected to the disk drive out to the disk drive to reflect the data into the disk drive; and removing power from the global cache memory, the disk control unit, and the disk drive after the data is reflected to the disk drive.

3. A method performed by a channel control unit for reading out data wherein a data read-out request is issued from an information processor to a storage control apparatus, the storage control apparatus including a plurality of channel control units each having an interface with the information processor; a disk control unit having an interface with a storage device for storing data; a first cache memory in each of the channel control units for temporarily storing data, to be interchanged between the information processor and the storage device, the first cache memory of at least two of the channel control units being connected to one another through a dedicated data transfer path; a plurality of second cache memories; a connector unit to provide data paths among the plurality of channel control units and the disk control unit separate from the dedicated data transfer path, the connector unit being connected to the second cache memories; a global cache memory connected to the connector unit; and a disk drive connected to the global cache memory, the method comprising:

receiving from the information processor a read-out command for data for which an address is specified;

determining whether the data at the specified address is stored in the first cache memory of a first channel control unit;

transmitting a read-out command of the data to one of the second cache memories if the data at the specified address is not stored in the first cache memory of the first channel control unit;

acquiring the data from said one of the second cache memories;

writing the acquired data to a first cache memory of the first channel control unit, wherein if the first cache memory does not have sufficient capacity to store the acquired data then first transmitting an amount of data stored in the first cache memory to said one of the second cache memories by way of the connector unit in order to obtain sufficient capacity in the first cache memory to store the acquired data;

transmitting the acquired data through the dedicated data transfer path to a second channel control unit connected to the first channel control unit;

receiving from the second channel control unit an acknowledgement indicating that writing of the acquired data to the first cache memory disposed in the second control unit has completed;

transmitting the acquired data to the information processor;

writing data in the first cache memory and said one of the second cache memories which is not yet reflected to the global cache memory out to the global cache memory to reflect the data into the global cache memory;

removing power from the first channel control unit and the second channel control unit after the data is reflected into the global cache memory;

writing data in the global cache memory which is not yet reflected to the disk drive out to the disk drive to reflect the data into the disk drive; and removing power from the global cache memory, the disk control unit, and the disk drive after the data is reflected to the disk drive.

4. A channel control unit in a storage control apparatus including a plurality of channel control units; a disk control unit having an interface with a storage device for storing data; a dedicated data transfer path; a second cache memory; a connector unit to provide data paths among the plurality of channel control units; a global cache memory connected to the connector unit; and a disk drive connected to the global cache memory, the disk control unit and the second cache memory being separate from the dedicated data transfer path, the connector unit being connected to the second cache memory, each channel control unit comprising:

a first cache memory for temporarily storing data to be interchanged between an information processor and the storage device, the first cache memory of at least two of the channel control units being connected to one another by the dedicated data transfer path for storing mutually temporarily stored data;

a first interface for transmitting to a second cache memory a read-out command for data stored in the second cache memory;

an acquiring portion for acquiring the data from the second cache memory;

a writing portion for writing the acquired data to the first cache memory;

a second interface for transmitting the acquired data through the dedicated data transfer path to another channel control unit; and a receiver for receiving from said another channel control unit an acknowledgement notifying that the writing of the transmitted data to the first cache memory disposed in said another channel control unit has completed, wherein the first interface transmits an amount of data from the first cache memory to the second cache memory via the connector unit when the first cache memory has insufficient capacity to store data to be written, the amount of data that is transmitted being sufficient to increase the capacity of the first cache memory, wherein data in the first cache memory and the second cache memory which is not yet reflected to the global cache memory is written to the global cache memory to reflect the data into the global cache memory, wherein power is removed from the plurality of channel control units after the data is reflected into the global cache memory, wherein data in the global cache memory which is not yet reflected to the disk drive is written to the disk drive to reflect the data into the disk drive; and wherein power is removed from the global cache memory, the disk control unit, and the disk drive after the data is reflected to the disk drive.

5. A channel control unit in a storage control apparatus including a plurality of channel control units; a disk control unit having an interface with a storage device for storing data; a dedicated data transfer path; at least one second cache memory; a connector unit to provide data paths among the plurality of channel control units; a global cache memory connected to the connector unit; and a disk drive connected to the global cache memory, the disk control unit and the at least one second cache memory separate from the dedicated data transfer path, the connector unit being connected to the at least one second cache memory, each channel control unit comprising:

an interface with an information processor;

a first cache memory for temporarily storing data to be interchanged between the information processor and the storage device, the first cache memory of at least two of the channel control units being connected to one another through the dedicated data transfer path;

a receiver for receiving from the information processor a read-out command for data for which an address is specified;

a determining portion for determining whether the data at the specified address is stored in the first cache memory;

a transmitter for transmitting the read-out command for the data to the at least one second cache memory if the data at the specified address is not stored in the first cache memory;

an acquiring portion for acquiring the data from the at least one second cache memory;

a writing portion for writing the acquired data to the first cache memory, wherein if the first cache memory does not have sufficient capacity to store the acquired data then an amount of data stored in the first cache memory is first transferred to the at least one second cache memory by way of the connector unit sufficient to obtain capacity in the first cache memory to store the acquired data;

a transmitter for transmitting the acquired data through the dedicated data transfer path to another channel control unit;

a receiver for receiving from said another channel control unit an acknowledgement indicating that the writing of the acquired data to the first cache memory disposed in said another channel control unit has completed; and a transmitter for transmitting the acquired data to the information processor, wherein data in the first cache memory and the at least one second cache memory which is not yet reflected to the global cache memory is written to the global cache memory to reflect the data into the global cache memory, wherein power is removed from the plurality of channel control units after the data is reflected into the global cache memory, wherein data in the global cache memory which is not yet reflected to the disk drive is written to the disk drive to reflect the data into the disk drive; and wherein power is removed from the global cache memory, the disk control unit, and the disk drive after the data is reflected to the disk drive.

6. A computer-readable medium containing a computer program executed on a first channel control unit in a storage control apparatus including a plurality of channel control units each having an interface with an information processor; a disk control unit having an interface with a storage device for storing data; a local cache memory in each channel unit for temporarily storing data to be interchanged between the information processor and the storage device, the local cache memory of at least two of the plurality of channel control units being connected to one another through a dedicated data transfer path used for storing mutually the temporarily stored data; a connector unit to provide data paths among the plurality of channel control units and the disk control unit separate from the dedicated data transfer path; a global cache memory connected to the connector unit; and a disk drive connected to the global cache memory, the computer program configured to cause the first channel control unit to perform steps comprising:

receiving data to be written from the information processor;

writing the data to be written to a local cache memory of the first channel control unit, wherein if the local cache memory does not have sufficient capacity to store the data to be written then first transmitting an amount of data stored in the local cache memory to the global cache memory by way of the connector unit in order to obtain sufficient capacity in the local cache memory to store the data to be written;

transmitting the data to be written through the dedicated data transfer path to a second channel control unit connected to the first channel control unit;

writing the transmitted data to the local memory of the second channel control unit;

receiving from the second channel control unit through the dedicated data transfer path an acknowledgement indicating that the writing of the data to the local cache memory disposed in the second channel control unit has completed;

transmitting the acknowledgement to the information processor;

writing data in the local cache memory of the first channel control unit and the local cache memory of the second control unit which is not yet reflected to the global cache memory out to the global cache memory to reflect the data into the global cache memory;

removing power from the first channel control unit and the second channel control unit after the data is reflected into the global cache memory;

writing data in the global cache memory which is not yet reflected to the disk drive out to the disk drive to reflect the data into the disk drive; and removing power from the global cache memory, the disk control unit, and the disk drive after the data is reflected to the disk drive.

7. A computer-readable medium containing a computer program executed on a first channel control unit in a storage control apparatus including a plurality of channel control units each having an interface with an information processor; a disk control unit having an interface with a storage device for storing data; a first cache memory in each channel unit for temporarily storing data to be interchanged between the information processor and the storage device, the first cache memory of at least two of the plurality of channel control units being connected to one another through a dedicated data transfer path used; at least two second cache memories; a connector unit to provide data paths among the plurality of channel control units; a global cache memory connected to the connector unit; and a disk drive connected to the global cache memory, the disk control unit and the at least two second cache memories being separate from the dedicated data transfer path, the connector unit being connected to the at least two second cache memories, the computer program configured to cause the first channel control unit to perform steps comprising:
- transmitting to one of the second cache memories a read-out command for data stored therein;
- acquiring the data from the one of the second cache memories;
- writing the acquired data to a first cache memory of the first channel control unit, wherein if the first cache memory does not have sufficient capacity to store the acquired data then first transmitting an amount of data stored in the first cache memory to the second cache memory by way of the connector unit in order to obtain sufficient capacity in the first cache memory to store the acquired data;
- transmitting the acquired data through the dedicated data transfer path to a second channel control unit connected to the first channel control unit; and
- receiving from the second channel control unit an acknowledgement indicating that the writing of the acquired data to the first cache memory disposed in the second channel control unit has completed;
- writing data in the first cache memory and the second cache memory which is not yet reflected to the global cache memory out to the global cache memory to reflect the data into the global cache memory;
- removing power from the first channel control unit and the second channel control unit after the data is reflected into the global cache memory;
- writing data in the global cache memory which is not yet reflected to the disk drive out to the disk drive to reflect the data into the disk drive; and
- removing power from the global cache memory, the disk control unit, and the disk drive after the data is reflected to the disk drive.

8. A computer-readable medium containing a computer program executed on a first channel control unit in a storage control apparatus including a plurality of channel control units each having an interface with an information processor; a disk control unit having an interface with a storage device for storing data; a first cache memory in each channel unit for temporarily storing data to be interchanged between the information processor and the storage device, the first cache memory of at least two of the plurality of channel control units being connected to one another through a dedicated data transfer path used for storing mutually the temporarily stored data; at least two second cache memories; a connector unit to provide data paths among the plurality of channel control units; a global cache memory connected to the connector unit; and a disk drive connected to the global cache memory, the disk control unit and the second cache memories being separate from the dedicated data transfer path, the connector unit being connected to the second cache memories, the computer program configured to cause the first channel control unit to perform steps comprising:
- receiving from the information processor a read-out command for data for which an address is specified;
- determining whether the data at the specified address is stored in a first cache memory of the first channel control unit;
- transmitting a read-out command for the data at the specified address to one of the second cache memories if the data is not stored in the first cache memory;
- acquiring the data from said one of the second cache memories;
- writing the acquired data to the first cache memory, wherein if the first cache memory does not have sufficient capacity to store the acquired data then first transmitting an amount of data stored in the first cache memory to said one of the second cache memories by way of the connector unit in order to obtain sufficient capacity in the first cache memory to store the acquired data;
- transmitting the acquired data through the dedicated data transfer path to a second channel control unit connected to the first channel control unit;
- receiving from the second channel control unit an acknowledgement indicating that the writing of the acquired data to the first cache memory disposed in the second channel control unit has completed;
- transmitting the acquired data to the information processor;
- writing data in the first cache memory and said one of the second cache memories which is not yet reflected to the global cache memory out to the global cache memory to reflect the data into the global cache memory;
- removing power from the first channel control unit and the second channel control unit after the data is reflected into the global cache memory;
- writing data in the global cache memory which is not yet reflected to the disk drive out to the disk drive to reflect the data into the disk drive; and
- removing power from the global cache memory, the disk control unit, and the disk drive after the data is reflected to the disk drive.

* * * * *